United States Patent
Liu et al.

(10) Patent No.: US 10,911,978 B2
(45) Date of Patent: Feb. 2, 2021

(54) DATA TRANSMISSION METHOD, DEVICE, AND COMMUNICATIONS SYSTEM

(71) Applicant: Huawei Technologies Co., Ltd., Shenzhen (CN)

(72) Inventors: Xing Liu, Shenzhen (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/716,333

(22) Filed: Dec. 16, 2019

(65) Prior Publication Data

US 2020/0120534 A1 Apr. 16, 2020

Related U.S. Application Data

(63) Continuation of application No. PCT/CN2018/099900, filed on Aug. 10, 2018.

(30) Foreign Application Priority Data

Aug. 11, 2017 (CN) .......................... 2017 1 0686889

(51) Int. Cl.
H04W 28/02 (2009.01)
H04W 80/02 (2009.01)

(52) U.S. Cl.
CPC ... *H04W 28/0263* (2013.01); *H04W 28/0268* (2013.01); *H04W 28/0278* (2013.01); *H04W 80/02* (2013.01)

(58) Field of Classification Search
CPC .................. H04W 28/0263; H04W 28/0268
See application file for complete search history.

(56) References Cited

U.S. PATENT DOCUMENTS 10,075,871 B2 * 9/2018 Chen ................. H04W 72/1284
10,439,682 B2 * 10/2019 Tseng ................. H04W 72/085
(Continued)

FOREIGN PATENT DOCUMENTS

| CN | 101132619 A | 2/2008 |
| CN | 101932019 A | 12/2010 |

(Continued)

OTHER PUBLICATIONS

"3rd Generation Partnership Project; Technical Specification Group Radio Access Network; NR; Medium Access Control (MAC) protocol specification (Release 15)," 3GPP TS 38.321 V0.2.0, pp. 1-36, 3rd Generation Partnership Project, Valbonne, France (Aug. 2017).

(Continued)

*Primary Examiner* — Parth Patel
(74) *Attorney, Agent, or Firm* — Leydig, Voit & Mayer, Ltd.

(57) ABSTRACT

A data transmission method, a device, and a communications system are described. The method includes generating, by a terminal device, first indication information. The first indication information is used to indicate logical channel groups having to-be-sent data and amount of to-be-sent data on part of the logical channel groups having to-be-sent data. The method includes sending, by the terminal device, the first indication information. According to the data transmission method, the device, and the communications system provided in the described embodiments, when a current quantity idle bits in a MAC PDU is insufficient, the terminal device may indicate, to a network device by using the first indication information, the LCGs having to-be-sent data on the terminal device. In this way, uplink transmission resource allocation improved efficiency.

22 Claims, 5 Drawing Sheets

(56) References Cited

U.S. PATENT DOCUMENTS

| | | | | |
|---|---|---|---|---|
| 10,448,414 B2* | 10/2019 | Ying | | H04L 5/0064 |
| 10,484,976 B2* | 11/2019 | Ying | | H04W 48/12 |
| 10,536,949 B2* | 1/2020 | Sheng | | H04W 48/12 |
| 10,548,047 B2* | 1/2020 | Yi | | H04L 47/24 |
| 10,581,559 B2* | 3/2020 | Nogami | | H04L 5/0055 |
| 10,595,166 B2* | 3/2020 | Yin | | H04N 21/41407 |
| 10,772,122 B2* | 9/2020 | Quan | | H04W 28/0278 |
| 2010/0189007 A1* | 7/2010 | Chun | | H04W 28/06 370/252 |
| 2010/0322098 A1* | 12/2010 | Pelletier | | H04W 72/1252 370/252 |
| 2011/0171967 A1* | 7/2011 | Lee | | H04W 72/0486 455/452.1 |
| 2011/0268087 A1* | 11/2011 | Kwon | | H04L 5/0005 370/331 |
| 2012/0033569 A1 | 2/2012 | Tesanovic et al. | | |
| 2012/0051255 A1 | 3/2012 | Han et al. | | |
| 2012/0099452 A1* | 4/2012 | Dai | | H04W 72/1284 370/252 |
| 2013/0100908 A1* | 4/2013 | Xu | | H04W 28/12 370/329 |
| 2013/0148580 A1 | 6/2013 | Han et al. | | |
| 2015/0319641 A1* | 11/2015 | Uchino | | H04W 72/1252 455/452.1 |
| 2016/0007229 A1* | 1/2016 | Gao | | H04W 72/1284 370/329 |
| 2016/0150564 A1* | 5/2016 | Quan | | H04W 28/0278 370/329 |
| 2016/0183241 A1* | 6/2016 | Lee | | H04W 56/0015 455/425 |
| 2017/0086168 A1* | 3/2017 | Takahashi | | H04W 28/0278 |
| 2017/0099615 A1* | 4/2017 | Tesanovic | | H04L 43/0817 |
| 2017/0127315 A1* | 5/2017 | Chen | | H04W 72/1284 |
| 2017/0223757 A1* | 8/2017 | Tsuboi | | H04W 92/18 |
| 2018/0270722 A1* | 9/2018 | Kim | | H04W 36/0072 |
| 2018/0343673 A1* | 11/2018 | Chen | | H04W 74/006 |
| 2018/0368012 A1* | 12/2018 | Wei | | H04W 72/1278 |
| 2018/0368166 A1* | 12/2018 | Jheng | | H04W 72/1284 |
| 2019/0230552 A1* | 7/2019 | Yu | | H04W 24/10 |
| 2019/0261408 A1* | 8/2019 | Lou | | H04W 72/1284 |
| 2019/0281493 A1 | 9/2019 | Li et al. | | |
| 2019/0320416 A1* | 10/2019 | Han | | H04W 28/06 |
| 2019/0342903 A1* | 11/2019 | Yu | | H04W 72/1268 |
| 2019/0357237 A1* | 11/2019 | Yu | | H04L 5/0094 |
| 2020/0022038 A1* | 1/2020 | Han | | H04W 74/0833 |
| 2020/0022221 A1* | 1/2020 | Liu | | H04W 72/10 |
| 2020/0068600 A1* | 2/2020 | Yu | | H04W 28/0278 |
| 2020/0068651 A1* | 2/2020 | Xu | | H04L 5/00 |
| 2020/0169966 A1* | 5/2020 | Chang | | H04W 52/325 |
| 2020/0178286 A1* | 6/2020 | Yu | | H04L 5/0048 |

FOREIGN PATENT DOCUMENTS

| | | |
|---|---|---|
| CN | 102111808 A | 6/2011 |
| CN | 102291200 A | 12/2011 |
| CN | 109152073 A | 1/2019 |
| WO | 2018231137 A1 | 12/2018 |

OTHER PUBLICATIONS

"BSR formats in NR," 3GPP TSG-RAN WG2 #98-AH, Qingdao, P.R. of China, XP051306855, R2-1707165, pp. 1-3, 3rd Generation Partnership Project, Valbonne, France (Jun. 27-29, 2017).

"BSR format," 3GPP Draft; R2-1705201,May 6, 2017 (May 6, 2017), XP051264798,total 4 pages.

* cited by examiner

ND COMMUNICATIONS SYSTEM

DATA TRANSMISSION METHOD, DEVICE, AND COMMUNICATIONS SYSTEM

CROSS-REFERENCE TO RELATED APPLICATIONS

This application claims is a continuation of International Application No. PCT/CN2018/099900, filed on Aug. 10, 2018, which claims priority to Chinese Patent Application No. 201710686889.7, filed on Aug. 11, 2017. The disclosures of the aforementioned applications are hereby incorporated by reference in their entireties.

TECHNICAL FIELD

Embodiments of this application relate to communications technologies, and in particular, to a data transmission method, a device, and a communications system.

BACKGROUND

In a future 5G communications system, a terminal device may report amount of to-be-sent data on the terminal device to a network device by using a buffer status report (BSR). In this way, the network device may allocate an uplink transmission resource to the terminal device based on the BSR sent by the terminal device. Data of different services is transmitted by using different logical channels (LCHs). Therefore, to prevent excessive signaling overhead of BSR reporting, a concept of logical channel group (LCG) in a long term evolution (LTE) communications system is used in the future 5G communications system. Therefore, the terminal device may report the BSR on a per-LCG basis. In this case, the network device may obtain, by using the BSR sent by the terminal device, amount of to-be-sent data on each LCG having to-be-sent data on the terminal device.

In the future 5G communications system, the terminal device may pad a media access control (MAC) protocol data unit (PDU) with to-be-sent data on each LCH, and send the MAC PDU to the network device. When current to-be-sent data on each LCH of the terminal device is insufficient to fully pad the MAC PDU—in other words, when the MAC PDU still has an idle bit location—the terminal device may pad the idle bit location in the MAC PDU with a BSR.

However, there is a need to resolve a problem of sending the BSR to the network device at the idle bit location in the MAC PDU at times when a quantity of idle bits in the MAC PDU is insufficient to accommodate the BSR.

SUMMARY

Embodiments of this application provide a data transmission method, a device, and a communications system, to resolve a prior-art technical problem of how a terminal device sends a BSR to a network device at an idle bit location in a MAC PDU.

According to a first aspect, an embodiment of this application provides a data transmission method, where the method includes: generating, by a terminal device, first indication information, where the first indication information is used to indicate logical channel groups having to-be-sent data and amount of to-be-sent data on part of the logical channel groups having to-be-sent data; and sending, by the terminal device, the first indication information.

According to the data transmission method provided in the first aspect, when idle bits in a MAC PDU is insufficient to accommodate a BSR that can indicate all the LCGs having to-be-sent data and amount of to-be-sent data on all the LCGs having to-be-sent data, the terminal device may generate the first indication information whose length is shorter than a length of the BSR, to indicate, by using the first indication information, the LCGs having to-be-sent data on the terminal device and the amount of the to-be-sent data on the part of the LCGs having to-be-sent data. In this manner, when idle bits in the MAC PDU is insufficient, the terminal device may still indicate, to a network device by using the first indication information, remaining LCGs having to-be-sent data on the terminal device. In this way, the network device can accurately learn of, in a timely manner, the remaining LCGs having to-be-sent data on the terminal device other than the LCGs whose amount of to-be-sent data are indicated, so that the network device allocates an uplink transmission resource to the terminal device more accurately and properly, thereby improving uplink transmission resource allocation efficiency.

In a possible implementation, each of the logical channel groups having to-be-sent data corresponds to one priority.

According to the data transmission method provided in this possible implementation, when bits in a MAC PDU is insufficient, the terminal device may select, based on priority of each LCG, LCGs, in the LCGs having to-be-sent data, whose amount of to-be-sent data are to be indicated by the first indication information. In this way, a network device can learn of, based on the priority of each LCG, the LCGs whose amount of to-be-sent data are indicated by the first indication information, so that the network device allocates, to the terminal device more accurately and properly, an uplink transmission resource for sending to-be-sent data on an LCG with a relatively high priority, thereby improving uplink transmission resource allocation efficiency.

In a possible implementation, priority of each of the part of the logical channel groups is higher than priorities of logical channel groups other than the part of the logical channel groups in the logical channel groups having to-be-sent data.

According to the data transmission method provided in this possible implementation, when idle bits in a MAC PDU is insufficient, the terminal device may select, based on priority of each LCG, LCGs, in the LCGs having to-be-sent data, whose amount of to-be-sent data are to be indicated by the first indication information. In this way, a network device can learn of, based on the priority of each LCG, the LCGs whose amount of to-be-sent data are indicated by the first indication information, so that the network device allocates, to the terminal device more accurately and properly, an uplink transmission resource for sending to-be-sent data on an LCG with a relatively high priority, thereby improving uplink transmission resource allocation efficiency.

In a possible implementation, the logical channel groups having to-be-sent data include at least one first logical channel group; and when a quantity of the at least one first logical channel group is less than a quantity of the part of the logical channel groups, the part of the logical channel groups include the at least one first logical channel group, and priorities of logical channel groups other than the at least one first logical channel group in the part of the logical channel groups are all higher than priorities of logical channel groups other than the part of the logical channel groups in the logical channel groups having to-be-sent data; or when a quantity of the at least one first logical channel group is equal to a quantity of the part of the logical channel groups, the at least one first logical channel group is used as the part of the logical channel groups; or when a quantity of the at least one first logical channel group is greater than a quantity of the part of the logical channel groups, part of the at least one first logical channel group are used as the part of the logical channel groups, and priority of each first logical channel group in the part of the logical channel groups is higher than priorities of first logical channel groups other than the part of the at least one first logical channel groups in the at least one first logical channel group.

According to the data transmission method provided in this possible implementation, when bits in a MAC PDU is insufficient and when the LCGs having to-be-sent data include the at least one first LCG, the terminal device may preferentially indicate amount of to-be-sent data on the first LCG by using the first indication information. In this way, a network device can preferentially learn of, based on the first indication information, the amount of the to-be-sent data on the first LCG, so that the network device allocates, to the terminal device more accurately and properly, an uplink transmission resource for sending the to-be-sent data on the first LCG, thereby improving uplink transmission resource allocation efficiency.

In a possible implementation, an air interface format corresponding to the first logical channel group is the same as an air interface format used for sending the first indication information.

According to the data transmission method provided in this possible implementation, when idle bits in a MAC PDU is insufficient and when the LCGs having to-be-sent data include at least one first LCG that uses an air interface format the same as that used by the terminal device to send the first indication information, the terminal device may preferentially indicate amount of to-be-sent data on the first LCG by using the first indication information. In this way, a network device can preferentially learn of, based on the first indication information, the amount of the to-be-sent data on the first LCG that uses an air interface format the same as that used for sending the first indication information, so that the network device allocates an uplink transmission resource corresponding to the air interface format to the terminal device more accurately and properly, thereby improving uplink transmission resource allocation efficiency.

In a possible implementation, the first indication information is further used to indicate a length of the first indication information.

According to the data transmission method provided in this possible implementation, the length of the first indication information is indicated, so that a network device can complete decoding of the first indication information or the like based on the length of the first indication information, thereby ensuring efficiency of the network device in decoding the first indication information.

In a possible implementation, the method further includes: receiving, by the terminal device, second indication information, where the second indication information is used to indicate priority corresponding to at least one first logical channel group of the terminal device.

According to the data transmission method provided in this possible implementation, each LCG may correspond to different priorities in different scenarios or cases. Priority of each LCG may be dynamically indicated by using the second indication information. In this way, the priority of each LCG is flexibly changeable, so that application scenarios of the data transmission method are expanded.

According to a second aspect, an embodiment of this application provides a data transmission method, where the method includes: receiving, by a network device, first indication information; and determining, by the network device based on the first indication information, logical channel groups having to-be-sent data and amount of to-be-sent data on part of the logical channel groups having to-be-sent data.

In a possible implementation, each of the logical channel groups having to-be-sent data corresponds to one priority.

In a possible implementation, priority of each of the part of the logical channel groups is higher than priorities of logical channel groups other than the part of the logical channel groups in the logical channel groups having to-be-sent data.

In a possible implementation, the logical channel groups having to-be-sent data include at least one first logical channel group; and when a quantity of the at least one first logical channel group is less than a quantity of the part of the logical channel groups, the part of the logical channel groups include the at least one first logical channel group, and priorities of logical channel groups other than the at least one first logical channel group in the part of the logical channel groups are all higher than priorities of logical channel groups other than the part of the logical channel groups in the logical channel groups having to-be-sent data; or when a quantity of the at least one first logical channel group is equal to a quantity of the part of the logical channel groups, the at least one first logical channel group is used as the part of the logical channel groups; or when a quantity of the at least one first logical channel group is greater than a quantity of the part of the logical channel groups, part of the at least one first logical channel group are used as the part of the logical channel groups, and priority of each first logical channel group in the part of the logical channel groups is higher than priorities of first logical channel groups other than the part of the at least one first logical channel groups in the at least one first logical channel group.

In a possible implementation, an air interface format corresponding to the first logical channel group is the same as an air interface format used for sending the first indication information.

In a possible implementation, the first indication information is further used to indicate a length of the first indication information.

In a possible implementation, the method further includes: sending, by the network device, second indication information, where the second indication information is used to indicate priority corresponding to at least one logical channel group of the terminal device.

For beneficial effects of the data transmission method provided in the second aspect and the possible implementations of the second aspect, refer to the beneficial effects of the first aspect and the possible implementations of the first aspect. Details are not described herein again.

According to a third aspect, an embodiment of this application provides a terminal device, including: a processor, configured to generate first indication information, where the first indication information is used to indicate logical channel groups having to-be-sent data and amount of to-be-sent data on part of the logical channel groups having to-be-sent data; and a transceiver, configured to send the first indication information.

In a possible implementation, each of the logical channel groups having to-be-sent data corresponds to one priority.

In a possible implementation, priority of each of the part of the logical channel groups is higher than priorities of logical channel groups other than the part of the logical channel groups in the logical channel groups having to-be-sent data.

In a possible implementation, the logical channel groups having to-be-sent data include at least one first logical channel group; and when a quantity of the at least one first logical channel group is less than a quantity of the part of the logical channel groups, the part of the logical channel groups include the at least one first logical channel group, and priorities of logical channel groups other than the at least one first logical channel group in the part of the logical channel groups are all higher than priorities of logical channel groups other than the part of the logical channel groups in the logical channel groups having to-be-sent data; or when a quantity of the at least one first logical channel group is equal to a quantity of the part of the logical channel groups, the at least one first logical channel group is used as the part of the logical channel groups; or when a quantity of the at least one first logical channel group is greater than a quantity of the part of the logical channel groups, part of the at least one first logical channel group are used as the part of the logical channel groups, and priority of each first logical channel group in the part of the logical channel groups is higher than priorities of first logical channel groups other than the part of the at least one first logical channel groups in the at least one first logical channel group.

In a possible implementation, an air interface format corresponding to the first logical channel group is the same as an air interface format used for sending the first indication information.

In a possible implementation, the first indication information is further used to indicate a length of the first indication information.

In a possible implementation, the terminal device further includes: the transceiver, configured to receive second indication information, where the second indication information is used to indicate priority corresponding to at least one first logical channel group of the terminal device.

For beneficial effects of the terminal device provided in the third aspect and the possible implementations of the third aspect, refer to the beneficial effects of the first aspect and the possible implementations of the first aspect. Details are not described herein again.

According to a fourth aspect, an embodiment of this application provides a network device, including: a transceiver, configured to receive first indication information; and a processor, configured to determine, based on the first indication information, logical channel groups having to-be-sent data and amount of to-be-sent data on part of the logical channel groups having to-be-sent data.

In a possible implementation, each of the logical channel groups having to-be-sent data corresponds to one priority.

In a possible implementation, priority of each of the part of the logical channel groups is higher than priorities of logical channel groups other than the part of the logical channel groups in the logical channel groups having to-be-sent data.

In a possible implementation, the logical channel groups having to-be-sent data include at least one first logical channel group; and when a quantity of the at least one first logical channel group is less than a quantity of the part of the logical channel groups, the part of the logical channel groups include the at least one first logical channel group, and priorities of logical channel groups other than the at least one first logical channel group in the part of the logical channel groups are all higher than priorities of logical channel groups other than the part of the logical channel groups in the logical channel groups having to-be-sent data; or when a quantity of the at least one first logical channel group is equal to a quantity of the part of the logical channel groups, the at least one first logical channel group is used as the part of the logical channel groups; or when a quantity of the at least one first logical channel group is greater than a quantity of the part of the logical channel groups, part of the at least one first logical channel group are used as the part of the logical channel groups, and priority of each first logical channel group in the part of the logical channel groups is higher than priorities of first logical channel groups other than the part of the at least one first logical channel groups in the at least one first logical channel group.

In a possible implementation, an air interface format corresponding to the first logical channel group is the same as an air interface format used for sending the first indication information.

In a possible implementation, the first indication information is further used to indicate a length of the first indication information.

In a possible implementation, the network device further includes: the transceiver, configured to send second indication information, where the second indication information is used to indicate priority corresponding to at least one first logical channel group of the terminal device.

For beneficial effects of the network device provided in the fourth aspect and the possible implementations of the fourth aspect, refer to the beneficial effects of the first aspect and the possible implementations of the first aspect. Details are not described herein again.

According to a fifth aspect, an embodiment of this application provides a terminal device, where the terminal device includes a processor, a memory, and a computer program that is stored in the memory and that can be executed by the processor; and the processor executes the computer program to implement the data transmission method provided in the first aspect and the possible implementations of the first aspect.

According to a sixth aspect, an embodiment of this application provides a network device, where the network device includes a processor, a memory, and a computer program that is stored in the memory and that can be executed by the processor; and the processor executes the computer program to implement the data transmission method provided in the second aspect and the possible implementations of the second aspect.

According to a seventh aspect, an embodiment of this application provides a terminal device, including at least one processing element (or chip) configured to perform the method in the first aspect.

According to an eighth aspect, an embodiment of this application provides a network device, including at least one processing element (or chip) configured to perform the method in the second aspect.

According to a ninth aspect, an embodiment of this application provides a data communications system, including the terminal device according to any one of the foregoing aspects and the network device according to any one of the foregoing aspects.

According to a tenth aspect, an embodiment of this application provides a program, where the program is used to perform the method in the first aspect when being executed by a processor.

According to an eleventh aspect, an embodiment of this application provides a program, where the program is used to perform the method in the second aspect when being executed by a processor.

According to a twelfth aspect, an embodiment of this application provides a program product, for example, a computer readable storage medium, including the program in the tenth aspect.

According to a thirteenth aspect, an embodiment of this application provides a program product, for example, a computer readable storage medium, including the program in the eleventh aspect.

According to a fourteenth aspect, an embodiment of this application provides a computer readable storage medium, where the computer readable storage medium stores an instruction, and when the instruction runs on a computer, the computer performs the method in the first aspect.

According to a fifteenth aspect, an embodiment of this application provides a computer readable storage medium, where the computer readable storage medium stores an instruction, and when the instruction runs on a computer, the computer performs the method in the second aspect.

According to the data transmission method, the device, and the communications system provided in the embodiments of this application, when idle bits in a MAC PDU is insufficient to accommodate a BSR that can indicate all the LCGs having to-be-sent data and amount of to-be-sent data on all the LCGs having to-be-sent data, the terminal device may generate the first indication information whose length is shorter than a length of the BSR, to indicate, by using the first indication information, the LCGs having to-be-sent data on the terminal device and the amount of the to-be-sent data on the part of the LCGs having to-be-sent data. In this manner, when idle bits in the MAC PDU is insufficient, the terminal device may further indicate, to the network device by using the first indication information, remaining LCGs having to-be-sent data on the terminal device. In this way, the network device can accurately learn of, in a timely manner, the remaining LCGs having to-be-sent data on the terminal device other than the LCGs whose amount of to-be-sent data are indicated, so that the network device allocates an uplink transmission resource to the terminal device more accurately and properly, thereby improving uplink transmission resource allocation efficiency.

DESCRIPTION OF EMBODIMENTS

Figure 1:
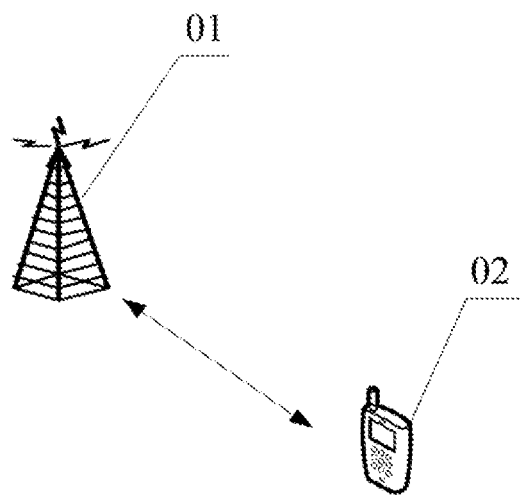
FIG. 1 is a symbolic diagram of a communications system according to an embodiment of this application.

FIG. 1 is a frame diagram of a communications system according to an embodiment of this application. As shown in FIG. 1, the communications system includes a network device 01 and a terminal device 02. The network device 01 may communicate with the terminal device 02 by using at least one air interface format.

The network device 01 may be a base station or various radio access points, or may be a device that communicates with the terminal device by using one or more sectors through an air interface in an access network. The base station may be configured to mutually convert a received over-the-air frame and an IP packet and serve as a router between a wireless terminal and a remaining portion of the access network, where the remaining portion of the access network may include an Internet protocol (IP) network. The base station may further coordinate attribute management of the air interface. For example, the base station may be a base transceiver station (BTS) in a global system for mobile communications (GSM) or code division multiple access (CDMA), may be a NodeB (NB) in wideband code division multiple access (WCDMA), or may be an evolved NodeB (Evolutional Node B, eNB or eNodeB) in long term evolution (LTE), a relay station or an access point, or a gNodeB gNB in a future 5G network. No limitation is set herein.

The terminal device 02 may be a wireless terminal or a wired terminal. The wireless terminal may be a device that provides a user with connectivity of voice and/or other service data, a handheld device with a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) and a computer with a mobile terminal, for example, may be a portable, pocket-sized, handheld, computer built-in, or in-vehicle mobile apparatus that exchanges voice and/or data with the radio access network. For example, the wireless terminal is a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, user equipment, or a sensor having a network access function. No limitation is set herein.

The air interface format may be an air interface format that varies with at least one of the following parameters or information (one instance of configuration information). Details are as follows:

Waveform parameter: also referred to as a parameter of a waveform. The waveform parameter is a parameter that can indicate or determine a waveform. As an example instead of a limitation, in this embodiment of this application, the waveform parameter may include at least one of the following parameters: a waveform parameter used in an orthogonal frequency division multiplexing (OFDM) technology, a waveform parameter used in single carrier frequency division multiple access (SC-OFDM), a waveform parameter used in a filter orthogonal frequency division multiplexing (filter OFDM) technology, a waveform parameter used in a universal filtered multicarrier (UFMC) technology, a waveform parameter used in a filter bank multicarrier (FBMC) technology, a waveform parameter used in a generalized frequency division multiplexing (GFDM) technology, and the like.

Modulation scheme: In a communications technology, to ensure a communication effect and overcome a problem in long-distance signal transmission, a signal spectrum may be transferred, through modulation, to a high-frequency channel for transmission. This process of loading a to-be-sent signal to a high-frequency signal is called modulation. As an example instead of a limitation, in this embodiment of this application, the modulation scheme may include at least one of the following schemes: amplitude shift keying (ASK) modulation, phase shift keying (PSK) modulation, frequency shift keying (FSK) modulation, quadrature amplitude modulation (QAM), minimum shift keying (MSK) modulation, Gaussian filtered minimum shift keying (GMSK) modulation, and OFDM modulation.

Bandwidth configuration: In this application, the bandwidth configuration may be a frequency domain resource usage width required by an air interface. As an example instead of a limitation, a bandwidth configuration corresponding to a broadband transmission service may be a minimum frequency domain resource width or quantity of subcarriers that is required by the air interface. A bandwidth configuration corresponding to a narrowband transmission service may be a maximum frequency domain resource width or quantity of subcarriers that is required by the air interface.

Radio frame configuration manner: subcarrier spacing (SCS), symbol length, cyclic prefix (CP), timing (e.g., duration between an uplink grant and uplink data transmission), duplex mode, length of a transmission time interval (TTI), length of a radio frame, and length of a radio subframe. For example, the duplex mode may be full duplex, half duplex (including an uplink-downlink configuration of half duplex), or flexible duplex. It should be noted that for some air interfaces, the duplex mode may be fixed or may change flexibly, and the transmission time interval may be fixed or may change flexibly. This is not specially limited in this embodiment of this application.

Resource multiplexing mode: As an example instead of a limitation, in this embodiment of this application, the resource multiplexing mode may include at least one of the following modes:

Frequency division multiplexing (FDM): Total bandwidth used for a transport channel is divided into several subbands (also referred to as subchannels), and each subchannel is used to transmit one channel of signals. Frequency division multiplexing requires that a total frequency width be greater than a sum of frequencies of the subchannels. In addition, to ensure that signals transmitted on the subchannels do not interfere with each other, a guard band is set between the subchannels. This (one of conditions) ensures that all channels of signals do not interfere with each other.

Time division multiplexing (TDM): Different signals are transmitted by using different time segments of a same physical connection. This can also implement multichannel transmission. In time division multiplexing, time is used as a parameter for signal partitioning. Therefore, all channels of signals cannot overlap with each other along a time axis. In time division multiplexing, a time for an entire channel for transmitting information is divided into several time slices (referred to as slots), and these slots are allocated to each signal source for use.

Spatial multiplexing (SM): A same band is reused in different space. In mobile communication, a basic technology that can implement space partitioning is using an adaptive array antenna to obtain different beams in different user directions. In addition, different users may be distinguished through space partitioning, each beam may provide a unique channel that is not interfered with by another user, different data of a same user may be distinguished through space partitioning, or same data of a same user may be distinguished through space partitioning, to obtain a higher gain.

Code division multiplexing (CDM): CDM is a multiplexing mode in which various channels of original signals are distinguished by using different codes. As an example instead of a limitation, CDM may include at least one of the following: code division multiple access (CDMA), frequency division multiple access (FDMA), time division multiple access (TDMA), and synchronous code division multiple access (SCDMA).

Channel configuration manner: In this embodiment of this application, different types of data or signals may be transmitted by using different channels. Therefore, the channel configuration manner may refer to a time-frequency resource, a code domain resource, or a space domain resource (e.g., a specified beam) corresponding to a channel. As an example instead of a limitation, in this embodiment of this application, a channel used in wireless communication may include at least one of the following channels or a combination of a plurality of the following channels: a control channel (which, for example, may include an uplink control channel and a downlink control channel) for transmitting control information, a data channel (which, for example, may include an uplink data channel and a downlink data channel) for transmitting data, a reference channel for transmitting a reference signal, and an access channel for sending access information.

Encoding mode: Encoding means converting a source symbol to improve communication effectiveness, or in other words, converting a source symbol to reduce or eliminate source redundancy. For example, a method is sought based on a statistical feature of a symbol sequence output from a source, to convert, into a shortest codeword sequence, the symbol sequence output from the source, so that each element of the shortest codeword sequence carries a maximum average information volume, and the original symbol sequence can also be restored without distortion. As an example instead of a limitation, in this embodiment of this application, the encoding mode may include at least one of the following modes: a polar code, a turbo code, and a convolutional code.

Protocol stack configuration manner: A protocol stack is an aggregation of all layers of protocols in a network, and vividly reflects a file transmission process in the network, to be specific, a process from an upper-layer protocol to an underlying protocol and then from the underlying protocol to the upper-layer protocol. As an example instead of a limitation, in this embodiment of this application, a protocol stack used in wireless communication may include at least one of the following protocol layers or a combination of a plurality of the following protocol layers: a packet data convergence protocol (PDCP) layer, a radio link control (RLC) layer, a media access control (MAC) layer, a physical layer, and a radio resource control (RRC) layer. A plurality of protocol entities may exist in each layer of protocol.

Multiple access mode: A multiple access technology differs from multiplexing in that there is no need to aggregate various channels of information, and instead, the various channels of information are separately modulated and sent to respective channels, and are obtained from the respective channels and modulated to obtain required information. As an example instead of a limitation, in this embodiment of this application, a multiple access mode used in wireless communication may include at least one of the following: FDMA, TDMA, CDMA, SCMA, non-orthogonal multiple access (NOMA), and multi-user shared access (MUSA).

It should be noted that the foregoing communications system may be an LTE communications system, or may be another future communications system, for example, a 5G communications system. No limitation is set herein.

In the LTE communications system, data of different services is transmitted by using different LCHs. Therefore, a concept of LCG is introduced to the LTE communications system. One LCG may include at least one LCH. Currently, there are four LCGs in total in the LTE system. In the prior art, a terminal device may send a BSR to a network device on a per-LCG basis. In this case, the network device may learn of, by using the BSR sent by the terminal device, an LCG having to-be-sent data on the terminal device and amount of to-be-sent data on the LCG. This is favorable for the network device to allocate an uplink transmission resource to the terminal device.

Figure 2:
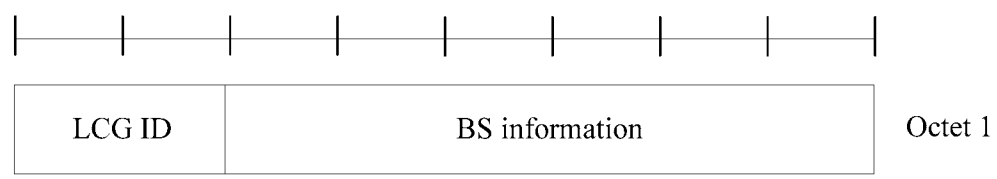
FIG. 2 is a schematic diagram of an existing BSR.
Figure 3:
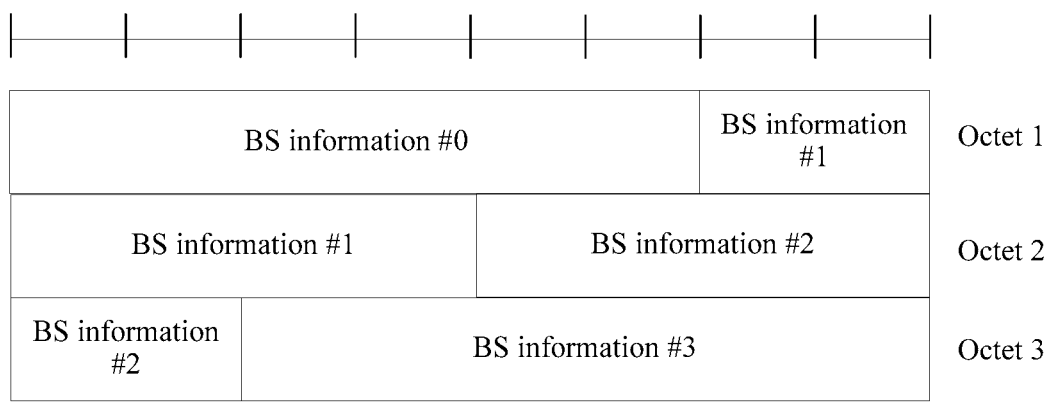
FIG. 3 is a schematic diagram of another existing BSR.

FIG. 2 is a schematic diagram of an existing BSR. In an LTE communications system, when a terminal device has only one LCG having to-be-sent data, the terminal device may send a short BSR shown in FIG. 2 to a network device. As shown in FIG. 2, the short BSR consist of one octet (an oct 1). The octet includes an identifier (ID) of the LCG having to-be-sent data and amount of to-be-sent data on the LCG. The amount of the to-be-sent data on the LCG may be specifically indicated by using buffer size (BS) information shown in FIG. 2. In all subsequent legends, BS information is used to indicate amount of to-be-sent data on an LCG. FIG. 3 is a schematic diagram of another existing BSR. In an LTE communications system, when a terminal device has at least two LCGs having to-be-sent data, the terminal device may send a long BSR shown in FIG. 3 to a network device. As shown in FIG. 3, the long BSR includes three octets (an oct 1, an oct 2, and an oct 3). In the long BSR, a field for sending amount of to-be-sent data on each LCG is fixed. Therefore, after receiving the long BSR, the network device may learn of the amount of the to-be-sent data on each LCG of the terminal device by using a value of the field corresponding to the LCG. For example, BS information #0 is amount of to-be-transmitted data on an LCG #0, BS information #1 is amount of to-be-transmitted data on an LCG #1, BS information #2 is amount of to-be-transmitted data on an LCG #2, and BS information #3 is amount of to-be-transmitted data on an LCG #3.

In the LTE communications system, the terminal device may send data to the network device by using a MAC PDU. The MAC PDU includes a MAC service data unit (SDU), a subheader corresponding to the MAC SDU, a MAC control element (CE), and a subheader corresponding to the MAC CE. The MAC SDU is used to transmit to-be-sent data on different LCHs, and the MAC CE is used to transmit some control information. Therefore, after receiving an uplink scheduling grant sent by the network device, the terminal device may perform logical channel prioritization (LCP) processing on current to-be-sent data on each LCH of the terminal device based on an uplink transmission resource that is indicated by the uplink scheduling grant and that is used to send the MAC PDU, to generate the MAC PDU. Then the terminal device may send the MAC PDU to the network device by using the uplink transmission resource indicated by the uplink scheduling grant, to transmit data of each service.

When the current to-be-sent data on each LCH of the terminal device is insufficient to fully pad the MAC PDU, in other words, when the MAC PDU still has an idle bit location, if a current quantity of idle bits in the MAC PDU is sufficient to accommodate one BSR, the terminal device may pad the idle bit location in the MAC PDU with one padding BSR. In the MAC PDU, the BSR may be considered as a MAC CE. Therefore, in this illustrative embodiment, the BSR is also referred to as a BSR MAC CE.

In the prior art, when the current quantity of idle bits in the MAC PDU is greater than or equal to a quantity of bits corresponding to a short BSR and a subheader and is less than a quantity of bits corresponding to a long BSR and a subheader, if the terminal device has only one LCG having to-be-sent data, the terminal device may pad the MAC PDU with a short BSR. If the terminal device has a plurality of LCGs having to-be-sent data, the terminal device may pad the MAC PDU with a truncated BSR. The truncated BSR has a same format as the short BSR shown in FIG. 2. In other words, the truncated BSR can also be used to indicate an identifier of only one LCG having to-be-sent data and amount of to-be-sent data on the LCG. A difference between the truncated BSR and the short BSR lies in that a subheader of the truncated BSR is different from the subheader of the short BSR. Therefore, the network device can learn, by using the subheader of the truncated BSR, whether the terminal device really has only one LCG having to-be-sent data.

Figure 4:
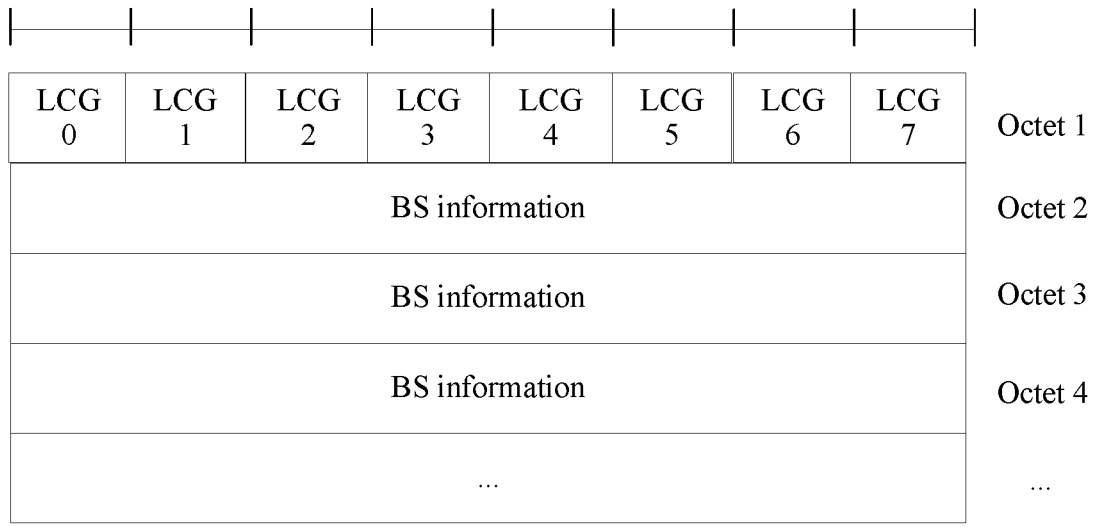
FIG. 4 is a schematic diagram of a BSR according to an embodiment of this application.

FIG. 4 is a schematic diagram of a BSR according to an illustrative embodiment. As shown in FIG. 4, in a future 5G communications system, LCHs may be classified into eight LCGs. Currently, a BSR format in the 5G communications system is still under discussion. A BSR format that may be chosen is shown in FIG. 4.

The BSR shown in FIG. 4 is used as an example. A first octet (an oct 1) of the BSR indicates, by using a bitmap, all LCGs having to-be-sent data on a terminal device. One bit in the bitmap corresponds to one LCG In the bitmap, each bit may correspond to one LCG in ascending order of serial numbers of the LCGs having to-be-sent data. FIG. 4 is a schematic diagram of the BSR in which each bit corresponds to one LCG in ascending order of the serial numbers of the LCGs having to-be-sent. When a bit is a first value, it indicates that an LCG corresponding to the bit is an LCG having to-be-sent data. When a bit is a second value, it indicates that an LCG corresponding to the bit is an LCG having no to-be-sent data. For example, when the first value is 1, the second value may be 0; or when the first value is 0, the second value may be 1.

Subsequent octets following the first octet (the oct 1) of the BSR are used to indicate amount of to-be-sent data on the LCGs having to-be-sent data that are indicated by the first octet. One octet (namely, BS information) is used to indicate a amount of to-be-sent data on one LCG having to-be-sent data. The amount of the to-be-sent data on the LCGs having to-be-sent data may be sorted based on a sequence of the LCGs in the bitmap. For example, the first value is 1, and the second value is 0. Assuming that each of the eight LCGs shown in FIG. 4 has to-be-sent data, the oct 1 may be 11111111. An oct 2 is amount of to-be-transmitted data on an LCG 0, an oct 3 is amount of to-be-transmitted data on an LCG 1, an oct 4 is amount of to-be-transmitted data on an LCG 2, and so on. In this scenario, the BSR has nine octets in total. Assuming that two of the eight LCGs shown in FIG. 4 have to-be-sent data, and the two LCGs are an LCG 2 and an LCG 7, the oct 1 may be 00100001. An oct 2 is amount of to-be-transmitted data on the LCG 2, and an oct 3 is amount of to-be-transmitted data on the LCG 7. In this scenario, the BSR has three octets in total. In other words, in the future 5G communications system, a length of the BSR may vary with a quantity of LCGs having to-be-sent data.

In the future 5G communications system, the terminal device may still send data to a network device by using a MAC PDU. Therefore, it is possible that current to-be-sent data on each LCH of the terminal device is insufficient to fully pad the MAC PDU, and idle bits in the MAC PDU is insufficient to accommodate the BSR shown in FIG. 4. In other words, the idle bits in the MAC PDU is insufficient to accommodate the BSR that carries the amount of the to-be-sent data on all the LCGs having to-be-sent data. In this case, if the terminal device continues to use the foregoing truncated BSR, after receiving the truncated BSR, the network device learns only that there is still an LCG having to-be-sent data on the terminal device, but the network device cannot learn of the exact LCGs. This is unfavorable for the network device to allocate an uplink transmission resource to the terminal device.

Therefore, considering the foregoing problem, the embodiments provide a data transmission method. The following describes in detail the technical solutions of the embodiments by using a future 5G communications system and the BSR that is shown in FIG. 4 as examples in some embodiments. The following several embodiments may be combined with each other, and a same or similar concept or process may not be described repeatedly in some embodiments.

Figure 5:
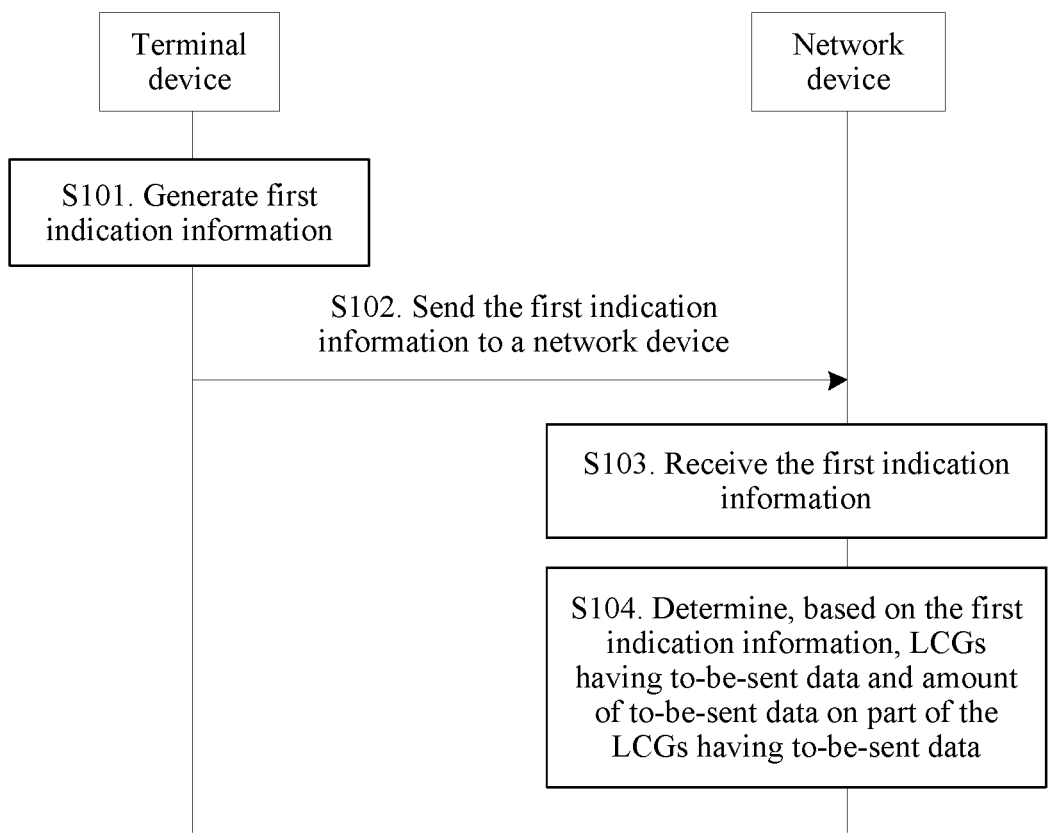
FIG. 5 is a signaling flowchart of a data transmission method according to an embodiment of this application.

FIG. 5 is a signaling flowchart of a data transmission method according to an embodiment. This embodiment relates to a specific process in which a terminal device sends first indication information to a network device when idle bits in a MAC PDU is insufficient to accommodate the BSR shown in FIG. 4, where the first indication information is used to indicate logical channel groups having to-be-sent data and amount of to-be-sent data on part of the logical channel groups having to-be-sent data. As shown in FIG. 5, the method may include the following steps.

S101. The terminal device generates the first indication information.

The first indication information is used to indicate the LCGs having to-be-sent data and the amount of the to-be-sent data on the part of the LCGs having to-be-sent data.

S102. The terminal device sends the first indication information to the network device.

S103. The network device receives the first indication information.

S104. The network device determines, based on the first indication information, the LCGs having to-be-sent data and the amount of the to-be-sent data on the part of the LCGs having to-be-sent data.

In this embodiment, when the idle bits in the MAC PDU is insufficient to accommodate the BSR shown in FIG. 4, that is, insufficient to accommodate a BSR that can indicate all the LCGs having to-be-sent data on the terminal device and amount of to-be-sent data on all the LCGs having to-be-sent data, the terminal device may generate the first indication information whose length is shorter than a length of the BSR, to indicate, by using the first indication information, the LCGs having to-be-sent data on the terminal device and the amount of the to-be-sent data on the part of the LCGs having to-be-sent data. In this manner, when the idle bits in the MAC PDU is insufficient, the terminal device may further indicate, to the network device by using the first indication information, that the terminal device still has an LCG having to-be-sent data. In this way, after receiving the first indication information, the network device can accurately learn of, in a timely manner, remaining LCGs having to-be-sent data on the terminal device other than the LCGs whose amount of to-be-sent data are indicated, so that the network device allocates an uplink transmission resource to the terminal device more accurately and properly, thereby improving uplink transmission resource allocation efficiency.

In this embodiment, the BSR format shown in FIG. 4 may continue to be used for the first indication information. To be specific, a first octet of the first indication information is used to indicate the LCGs having to-be-sent data, and subsequent octets are used to indicate the amount of the to-be-sent data on the part of the LCGs having to-be-sent data. One octet is used to indicate amount of to-be-sent data on one LCG. A difference between the first indication information and the BSR shown in FIG. 4 lies in that the first indication information indicates amount of to-be-sent data on fewer LCGs having to-be-sent data than the BSR shown in FIG. 4. Therefore, the first indication information may also be referred to as a truncated BSR in a 5G communications system. A person skilled in the art may understand that, in a 5G mobile communications system, the term truncated BSR or BSR may continue to be used for the first indication information, or another term may be used. Therefore, naming of the first indication information in each communications system is not limited in this embodiment.

The following describes which LCGs having to-be-sent data and amount of to-be-sent data on which LCGs in the LCGs having to-be-sent data are indicated by the first indication information.

The LCGs having to-be-sent data that are indicated by the first indication information may be all the LCGs having to-be-sent data on the terminal device, or may be part of all the LCGs having to-be-sent data on the terminal device.

For example, a plurality of air interface formats listed above are introduced to the future 5G communications system. Each LCH may be mapped to at least one air interface format. To be specific, to-be-sent data on the LCH may be mapped, for transmission, to a time-frequency resource corresponding to the LCH. For example, it is assumed that two air interface formats are configured for the network device, and the two air interface formats are an air interface format 1 and an air interface format 2. An LCH 1 of the terminal device may be mapped to the air interface format 1, and an LCH 2 of the terminal device may be mapped to the air interface format 1 and the air interface format 2. In other words, to-be-sent data on the LCH 1 may be transmitted by using a time-frequency resource corresponding to the air interface format 1, and to-be-sent data on the LCH2 may be transmitted by using the time-frequency resource corresponding to the air interface format 1 and a time-frequency resource corresponding to the air interface format 2. Alternatively, to-be-sent data on the LCH 1 may be preferentially transmitted by using a time-frequency resource corresponding to the air interface format 1, or can be transmitted only by using a time-frequency resource corresponding to the air interface format 1; and the LCH 2 may be preferentially transmitted by using the time-frequency resource corresponding to the air interface format 1 and a time-frequency resource corresponding to the air interface format 2, or can be transmitted only by using the time-frequency resource corresponding to the air interface format 1 and a time-frequency resource corresponding to the air interface format 2; or the like.

Therefore, the part of all the LCGs having to-be-sent data on the terminal device may be LCGs, in all the LCGs having to-be-sent data on the terminal device, that have one corresponding air interface format the same as an air interface format currently used by the terminal device to send the first indication information; may be LCGs, in all the LCGs having to-be-sent data on the terminal device, whose amount of to-be-sent data are greater than a preset threshold; may be LCGs, in all the LCGs having to-be-sent data on the terminal device, whose amount of to-be-sent data are greater than a preset threshold and that have one corresponding air interface format the same as an air interface format currently used by the terminal device to send the first indication information; or the like. This may be specifically determined based on a configuration of the communications system. The air interface format corresponding to an LCG may be preset, may be an air interface format to which all LCHs in the LCG can be mapped, may be an air interface format to which any LCH in the LCG can be mapped, may be an air interface format to which any LCH currently having to-be-sent data in the LCG can be mapped, or the like.

For example, it is assumed that LCGs currently having to-be-sent data on the terminal device are an LCG 1, an LCG 2, an LCG 4, and an LCG 7. One of air interface formats corresponding to the LCG 1 and one of air interface formats corresponding to the LCG 4 are the same as the air interface format currently used by the terminal device to send the first indication information. In this case, the terminal device may generate first indication information that is used to indicate the LCG 1, the LCG 4, and amount of to-be-sent data on either of the LCG 1 and the LCG 4.

It should be noted that in an implementation, when the terminal device performs LCP based on a mapping relationship between each LCH and an air interface format, joint processing can be performed on uplink resources only when LCHs to which air interface formats of the uplink resources are mapped are the same. For example, when an LCH 0, an LCH 1, and an LCH 2 are all mapped to a first air interface format, but only the LCH 0 and the LCH 1 are mapped to a second air interface format, joint processing cannot be performed on an uplink resource that uses the first air interface format and an uplink resource that uses the second air interface format. For example, when an LCH 0, an LCH 1, and an LCH 2 are all mapped to a first air interface format, and the LCH 0, the LCH 1, and the LCH 2 may also be all mapped to a second air interface format, joint processing can be performed on an uplink resource that uses the first air interface format and an uplink resource that uses the second air interface format. The joint processing on a plurality of uplink resources means that the terminal device may add these uplink resources and perform LCP on a sum. For example, when a first uplink resource has 100 bits, a second uplink resource has 300 bits, and joint processing can be performed on the first uplink resource and the second uplink resource, the terminal device adds the two uplink resources to obtain resources of 400 bits in total, and then performs LCP on the 400 bits.

As described above, the first indication information is used to indicate the amount of the to-be-sent data on the part of the LCGs having to-be-sent data. A quantity of the part of LCGs herein may be determined based on a system configuration, may be determined based on a length of the first indication information that can be sent by the terminal device, or the like. For example, it is assumed that the length of the first indication information is three octets. A first octet (an oct 1) of the first indication information is used to indicate the LCGs having to-be-sent data, and each of subsequent octets may be used to indicate amount of to-be-sent data on one LCG having to-be-sent data. Therefore, it may be determined that the first indication information can indicate amount of to-be-sent data on two of the LCGs having to-be-sent data. It should be noted that the length of the first indication information may be indicated to the terminal device by a base station by using indication information, or may be determined by the terminal device based on a quantity of bits in the MAC PDU that are used for sending the first indication information. For example, when the terminal device sends the first indication information by using an idle bit location in the MAC PDU, the terminal device may determine a size of the first indication information based on the idle bits in the MAC PDU.

As described above, the first indication information is used to indicate the amount of the to-be-sent data on the part of the LCGs having to-be-sent data. The part of the LCGs herein may be specifically determined, from the LCGs having to-be-sent data, based on the quantity of the part of the LCGs. Specifically, the following several cases may exist:

In a first case, when each LCG of the terminal device corresponds to one priority, priority of each of the part of the LCGs herein is higher than priorities of LCGs other than the part of the LCGs in the LCGs having to-be-sent data. In this way, after receiving the first indication information, the network device may learn of, based on the LCGs having to-be-sent data that are indicated by the first indication information and priorities of the LCGs, the LCGs whose amount of to-be-sent data are actually indicated by the first indication information.

The priorities of the LCGs may be preset, or may be dynamically indicated by the network device. Therefore, in some embodiments, the network device may further send second indication information to the terminal device, to indicate, by using the second indication information, priority corresponding to at least one first LCG of the terminal device. For example, the second indication information is used to indicate only priority of an LCG whose priority is changed, or the second indication information is used to indicate priorities of all LCGs. In this case, after receiving the second indication information, the terminal device may learn of priority of each LCG based on the second indication information. During specific implementation, the second indication information may be carried in physical layer signaling, system information block (SIB) signaling, resource control (RRC) signaling, downlink control signaling, or the like, and sent to the terminal device.

Optionally, before the network device sends the second indication information to the terminal device, the network device may further determine the priority corresponding to each LCG of the terminal device. During specific implementation, the network device may determine the priority of each LCG based on priority of the logic channel included in the LCG For example, the network device may use priority of a lowest-priority logic channel in the LCG as priority of the LCG or use priority of highest-priority logic channel in the LCG as priority of the LCG In some embodiments, when a plurality of priority tables are preset on a network device side, and each priority table represents one mapping relationship between LCG and priority, after determining a currently used priority table, the network device may indicate, by using the second indication information, priority corresponding to the LCG specified in the priority table.

In some embodiments, priority of the LCG may correspond to priority of the LCH included in the LCG. For example, priority of each LCH included in high-priority LCG is higher than priority of each LCH included in low-priority LCG. In other words, high-priority LCHs are classified into one LCG. In this way, when the idle bits in the MAC PDU is insufficient to accommodate the BSR shown in FIG. 4, the terminal device can learn of the priority of each LCG based on the priority of the LCH in each LCG of the terminal device. Therefore, the terminal device may determine, based on the priority of each LCG, the LCGs having to-be-sent data, and the quantity of the part of the LCGs, the part of the LCGs from the LCGs having to-be-sent data, and indicate the amount of the to-be-sent data on the part of the LCGs by using the first indication information. Correspondingly, after receiving the first indication information sent by the terminal device, the network device may also determine, in a same manner as a terminal device side, LCGs whose amount of to-be-sent data are actually indicated by the first indication information in the LCGs having to-be-sent data. Details are not described herein again.

For example, priority of highest-priority LCH in LCHs included in a high-priority LCG is higher than priority of a highest-priority LCH in LCHs included in a low-priority LCG; or priority of a lowest-priority LCH in LCHs included in a high-priority LCG is higher than priority of a lowest-priority LCH in LCHs included in a low-priority LCG In other words, priority of an LCG is determined by a highest-priority LCH or a lowest-priority LCH in the LCG The terminal device may learn of priority of each LCG based on priority of a highest-priority LCH in the LCG or priority of lowest-priority LCH in the LCG It should be understood that the foregoing manner of determining priority of the LCG is merely used as an example in this embodiment, and this embodiment does not limit a manner of determining priority of the LCG In some embodiments, the network device may further send third indication information to the terminal device, to instruct the terminal device to send the first indication information. In this case, after receiving the third indication information, the terminal device may send the first indication information to the network device when the idle bits in the MAC PDU is insufficient to accommodate the BSR shown in FIG. 4. During specific implementation, the third indication information may be carried in physical layer signaling, system information block (SIB) signaling, resource control (RRC) signaling, downlink control signaling, or the like, and sent to the terminal device.

Figure 6:
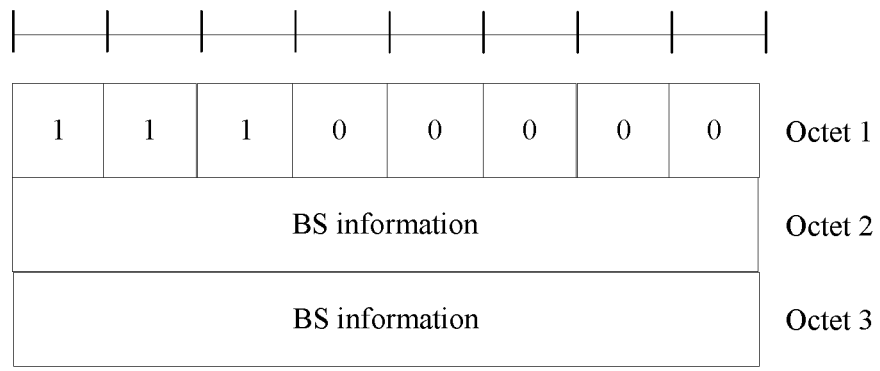
FIG. 6 is a schematic diagram of another BSR according to an embodiment of this application.

FIG. 6 is a schematic diagram of another BSR according to an embodiment. For example, the LCGs having to-be-sent data are an LCG 0, an LCG 1, and an LCG 2, priority of the LCG 2 is higher than priority of the LCG 0, and the priority of the LCG 0 is higher than priority of the LCG 1. It is assumed that the first indication information may be used to indicate amount of to-be-sent data on two LCGs. The terminal device may generate first indication information that is used to indicate the LCG 0, the LCG 1, the LCG 2, amount of to-be-sent data on the LCG 0, and amount of to-be-sent data on the LCG 2. As shown in FIG. 6, a first octet (an oct 1) of the first indication information may be 11100000, a second octet oct 2 is used to indicate the amount of the to-be-sent data on the LCG 0, and a third octet oct 3 is used to indicate the amount of the to-be-sent data on the LCG 2.

It should be noted that, in the first indication information, the amount of the to-be-sent data on the part of the LCGs selected from the LCGs having to-be-sent data are still arranged based on bit locations corresponding to the LCGs in the first octet.

In a second case, each LCG of the terminal device corresponds to one priority, and the LCGs having to-be-sent data include at least one first LCG In this scenario, if a quantity of the at least one first LCG is less than the quantity of the part of the LCGs, the part of the LCGs include the at least one first LCG, and priorities of LCGs other than the at least one first LCG in the part of the LCGs are all higher than priorities of LCGs other than the quantity of LCGs in the LCGs having to-be-sent data. In other words, the LCGs other than the first LCG in the part of the LCGs each are a high-priority LCG in the LCGs having to-be-sent data.

When a quantity of the at least one first LCG is equal to the quantity of the part of the LCGs, the at least one first LCG may be directly used as the part of the LCGs. In other words, the part of the LCGs include only the first LCG.

When a quantity of the at least one first LCG is greater than the quantity of the part of the LCGs, part of the at least one first LCG are used as the part of the LCGs. Priority of each first LCG in the part of the LCGs is higher than priorities of first LCGs, in the first LCG, other than the LCGs in the part of the LCGs. In other words, the part of the LCGs include only first LCGs with relatively high priorities.

Optionally, the first LCG may be an LCG, in the LCGs having to-be-sent data, that uses an air interface format the same as that used for sending the first indication information.

During specific implementation, the terminal device may determine, based on an air interface format corresponding to the LCGs having to-be-sent data and the air interface format used for sending the first indication information, whether the LCGs having to-be-sent data include a first LCG. If a quantity of first LCGs in the LCGs having to-be-sent data is less than a quantity of LCGs whose amount of to-be-sent data can be indicated by the first indication information, the terminal device may further select, in the manner described in the foregoing first case and based on the priority of each LCG, some LCGs from remaining LCGs having to-be-sent data, so that a total quantity of the first LCGs and the some LCGs selected from the remaining LCGs having to-be-sent data is the quantity of LCGs whose amount of to-be-sent data can be indicated by the first indication information. If a quantity of first LCGs in the LCGs having to-be-sent data is equal to a quantity of LCGs whose amount of to-be-sent data can be indicated by the first indication information, the terminal device may use quantity of first LCGs as the LCGs whose amount of to-be-sent data can be indicated by the first indication information. If a quantity of first LCGs in the LCGs having to-be-sent data is greater than a quantity of LCGs whose amount of to-be-sent data can be indicated by the first indication information, the terminal device may select, from multiple first LCGs based on priority of each first LCG, first LCGs whose amount of to-be-sent data can be indicated by the first indication information.

Correspondingly, after receiving the first indication information sent by the terminal device, the network device may also determine, in a same manner as a terminal device side, LCGs whose amount of to-be-sent data are actually indicated by the first indication information in the LCGs having to-be-sent data. Details are not described herein again.

Optionally, the first LCG may be an LCG selected, based on another preset condition, from the LCGs having to-be-sent data. For example, the first LCG is an LCG with a delay less than or equal to a preset delay threshold (e.g., the preset delay threshold may be a delay of an LCH, in the LCG; for transmitting a service with a highest delay requirement). Details are not described herein.

In a third case, the part of the LCGs may be alternatively selected, based on the determined quantity of the part of the LCGs in ascending order of serial numbers of the LCGs having to-be-sent data, from the LCGs having to-be-sent data.

For example, it is assumed that the LCGs having to-be-sent data are an LCG 0, an LCG 1, an LCG 4, and an LCG 5, and the quantity of the part of the LCGs having to-be-sent data is 3. For example, the part of the LCGs are selected, in ascending order of the serial numbers of the LCGs having to-be-sent, from the LCGs having to-be-sent data. In this case, the part of the LCGs may be, for example, the LCG 0, the LCG 1, and the LCG 4. In other words, the first indication information is used to indicate the LCG 0, the LCG 1, the LCG 4, the LCG 5, amount of to-be-sent data on the LCG 0, amount of to-be-sent data on the LCG 1, and amount of to-be-sent data on the LCG 4.

Correspondingly, after receiving the first indication information sent by the terminal device, the network device may also determine, in a same manner as a terminal device side, LCGs whose amount of to-be-sent data are actually indicated by the first indication information in the LCGs having to-be-sent data. Details are not described herein again.

As described in the foregoing embodiment, when the idle bits in the MAC PDU is insufficient to accommodate the BSR shown in FIG. 4, the first indication information is sent to the network device by the terminal device by using the MAC PDU. Therefore, the first indication information is usually located at a trailer of the MAC PDU. In this scenario, after receiving the MAC PDU and decoding a MAC CE or a MAC SDU that is located before the first indication information in the MAC PDU, the network device may automatically determine the length of the first indication information based on a quantity of remaining bits in the MAC PDU. In this case, the network device may complete decoding of the first indication information based on the length of the first indication information.

Optionally, in some embodiments, the first indication information is not located at a trailer of the MAC PDU, in other words, there is still a MAC SDU or a MAC CE after a bit location at which the first indication information is located in the MAC PDU. In this scenario, the first indication information may be further used to indicate the length of the first indication information, so that the network device can complete decoding or the like of the first indication information based on the length of the first indication information, thereby ensuring efficiency of the network device in decoding the first indication information.

It should be noted that although in all the foregoing embodiments, the first indication information is described with reference to scenarios in which the idle bits in the MAC PDU is insufficient to accommodate the BSR shown in FIG. 4, a person skilled in the art may understand that an application scenario of the first indication information is not limited thereto. The data transmission method provided in this embodiment can be used in any scenario in which the terminal device needs to send, to the network device, indication information that is used to indicate amount of to-be-sent data on an LCG. Details are not described herein. In addition, although in this embodiment, the first indication information is described by using a BSR format used when LCHs are classified into eight LCGs as an example, a person skilled in the art may understand that a format of the first indication information is not limited thereto. When LCHs are classified into another quantity of LCGs, or when a quantity of bits for indicating amount of to-be-sent data is changed (e.g., to 5), the format of the first indication information may also be adjusted or changed adaptively. Details are not described herein.

In addition, in some extreme cases, for example, when the idle bits in the MAC PDU can accommodate only one-octet first indication information, the first indication information may be used to indicate only the LCGs having to-be-sent data, without indicating amount of to-be-sent data on any LCG having to-be-sent data. An implementation and technical effects thereof are similar to those described above. Details are not described herein again.

According to the data transmission method provided in this embodiment, when the idle bits in the MAC PDU is insufficient to accommodate the BSR that can indicate all the LCGs having to-be-sent data and the amount of the to-be-sent data on all the LCGs having to-be-sent data, the terminal device may generate the first indication information whose length is shorter than the length of the BSR, to indicate, by using the first indication information, the LCGs having to-be-sent data on the terminal device and the amount of the to-be-sent data on the part of the LCGs having to-be-sent data. In this manner, when the idle bits in the MAC PDU is insufficient, the terminal device may further indicate, to the network device by using the first indication information, remaining LCGs having to-be-sent data on the terminal device. In this way, the network device can accurately learn of, in a timely manner, the remaining LCGs having to-be-sent data on the terminal device other than the LCGs whose amount of to-be-sent data are indicated, so that the network device allocates an uplink transmission resource to the terminal device more accurately and properly, thereby improving uplink transmission resource allocation efficiency.

In all the foregoing embodiments, the data transmission method provided in this embodiment is described by using an example in which the terminal device may generate, when the idle bits in the MAC PDU is insufficient to accommodate the BSR shown in FIG. 4, the first indication information whose length is shorter than the length of the BSR. However, when the idle bits in the MAC PDU is insufficient to accommodate the BSR shown in FIG. 4, the future 5G communications system may allow the terminal device to pad the MAC PDU with a truncated BSR. The truncated BSR may be used to indicate the part of the LCGs having to-be-sent data and amount of to-be-sent data on these LCGs. In other words, when the idle bits in the MAC PDU are insufficient to accommodate the BSR that can indicate all the LCGs having to-be-sent data on the terminal device and the amount of the to-be-sent data on all the LCGs having to-be-sent data, the terminal device may pad the MAC PDU with a truncated BSR that is used to indicate the part of the LCGs having to-be-sent data and the amount of the to-be-sent data on these LCGs.

Optionally, the BSR format shown in FIG. 2 or FIG. 4 may continue to be used for the truncated BSR. The BSR format shown in FIG. 4 is used as an example. A first octet of the truncated BSR is used to indicate the LCGs whose amount of to-be-sent data are indicated, and subsequent octets are used to indicate the amount of the to-be-sent data on these LCGs. One octet is used to indicate amount of to-be-sent data on one LCG. A difference between the truncated BSR and the BSR shown in FIG. 4 lies in that the BSR shown in FIG. 4 additionally indicates part of LCGs having to-be-sent data and amount of to-be-sent data on these LCGs. It should be noted that the BSR shown in FIG. 2 or FIG. 4 is merely an example. A BSR structure shown in FIG. 2 or FIG. 4 may be used for the truncated BSR, but a quantity of bits for indicating amount of to-be-sent data may be changed adaptively, for example, may be 5 or 9.

Figure 7:
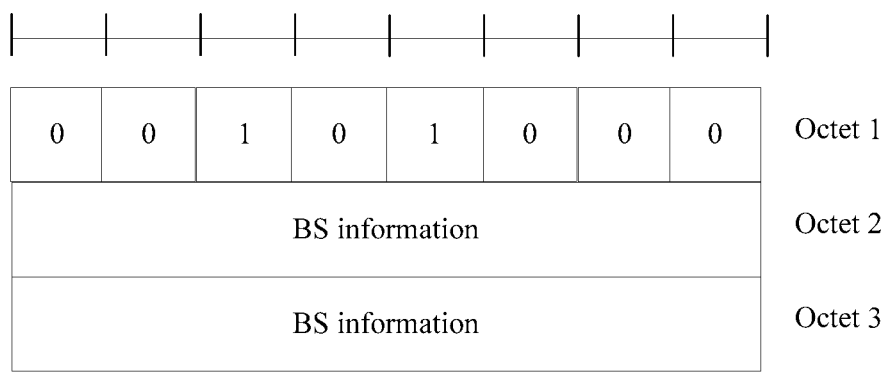
FIG. 7 is a schematic diagram of still another BSR according to an embodiment of this application.

FIG. 7 is a schematic diagram of still another BSR according to an embodiment. As shown in FIG. 7, it is assumed that each of eight LCGs shown in FIG. 7 has to-be-sent data, but idle bits in a current MAC PDU can accommodate only a three-octet truncated BSR. For example, if amount of to-be-sent data on an LCG 2 and an LCG 4 can be indicated by the truncated BSR, an oct 1 of the truncated BSR may be 00101000. An oct 2 is amount of to-be-transmitted data on the LCG 2, and an oct 3 is a amount of to-be-transmitted data on the LCG 4.

In this manner, a network device can learn of, by using a first octet of the truncated BSR, LCGs that are indicated by the truncated BSR, can learn of amount of to-be-sent data on the indicated LCGs by using subsequent octets, and can further learn, by using a subheader of the truncated BSR, that there is still an LCG having to-be-sent data on a terminal device.

A person skilled in the art may understand that, in a 5G mobile communications system, the term truncated BSR or BSR may continue to be used for the truncated BSR, or another term may be used. Therefore, naming of the truncated BSR in each communications system is not limited in this embodiment. In addition, when the BSR format shown in FIG. 2 or FIG. 4 continues to be used for the truncated BSR, a subheader different from a subheader used by the BSR shown in FIG. 2 or FIG. 4 may be used for the truncated BSR. Therefore, the network device can learn, by using the subheader of the truncated BSR, whether the terminal device has another LCG having to-be-sent data.

The following describes which LCGs having to-be-sent data are indicated by the truncated BSR.

For example, the truncated BSR is used to indicate part of all LCGs having to-be-sent data on the terminal device and amount of to-be-sent data on the some part of the LCGs. A quantity of the part of the LCGs herein may be determined based on a system configuration, may be determined based on a length of the truncated BSR that can be sent by the terminal device, or the like. For example, it is assumed that the length of the truncated BSR is three octets. A first octet (an oct 1) of the truncated BSR is used to indicate the LCGs having to-be-sent data, and each of subsequent octets may be used to indicate amount of to-be-sent data on one LCG having to-be-sent data. Therefore, it may be determined that the truncated BSR can indicate amount of to-be-sent data on two of the LCGs having to-be-sent data. It should be noted that the length of the truncated BSR may be indicated to the terminal device by a base station by using indication information, or may be determined by the terminal device based on a quantity of bits in the MAC PDU that are used for sending the truncated BSR. For example, when the terminal device sends the truncated BSR by using an idle bit location in the MAC PDU, the terminal device may determine a size of the truncated BSR based on the idle bits in the MAC PDU.

As described above, the truncated BSR is used to indicate the part of all the LCGs having to-be-sent data on the terminal device and the amount of the to-be-sent data on these LCGs. The part of the LCGs herein may be specifically determined, from the LCGs having to-be-sent data, based on the quantity of the part of the LCGs. Specifically, the following several cases may exist:

In a first case, when each LCG of the terminal device corresponds to one priority, priority of each of the part of the LCGs herein is higher than priorities of LCGs other than the part of the LCGs in the LCGs having to-be-sent data.

For descriptions of an implementation of the first case, refer to descriptions in the foregoing embodiment. Details are not described herein again.

In addition, in this embodiment, when priority of the LCG may correspond to priority of the LCH included in the LCG the priority of the LCG may be determined based on priority of the LCH having to-be-sent data in the LCG For example, priority of highest-priority logic channel in LCHs having to-be-sent data that are included in high-priority LCG is higher than priority of a highest-priority LCH in LCHs having to-be-sent data that are included in a low-priority LCG; or priority of lowest-priority LCH in LCHs having to-be-sent data that are included in high-priority LCG is higher than priority of lowest-priority LCH in LCHs having to-be-sent data that are included in a low-priority LCG In other words, priority of the LCG is determined by highest-priority or lowest-priority LCH having to-be-sent data in the LCG The terminal device may learn of priority of each LCG based on priority of a highest-priority LCH in the LCG or priority of lowest-priority LCH in the LCG It should be understood that the foregoing manner of determining priority of the LCG is merely used as an example in this embodiment, and this embodiment does not limit a manner of determining priority of the LCG In a second case, each LCG of the terminal device corresponds to one priority, and all the LCGs having to-be-sent data include at least one first LCG In this scenario, if a quantity of the at least one first LCG is less than the quantity of the part of the LCGs, the part of the LCGs include the at least one first LCG, and priorities of LCGs other than the at least one first LCG in the part of the LCGs are all higher than priorities of LCGs other than the part of the LCGs in the LCGs having to-be-sent data having to-be-sent data. In other words, the LCGs other than the first LCG in the part of the LCGs each are a high-priority LCG in all the LCGs having to-be-sent data.

When a quantity of the at least one first LCG is equal to the quantity of the part of the LCGs, the at least one first LCG may be directly used as the part of the LCGs. In other words, the part of the LCGs include only the first LCG.

When a quantity of the at least one first LCG is greater than the quantity of the part of the LCGs, part of the at least one first LCG are used as the part of the LCGs. Priority of each first LCG in the part of the LCGs is higher than priorities of first LCGs, in the first LCG, other than the first LCGs in the part of the LCGs. In other words, the part of the LCGs include only first LCGs with relatively high priorities.

Optionally, the first LCG may be an LCG, in the LCGs having to-be-sent data, that uses an air interface format the same as that used for sending the truncated BSR. For descriptions of this implementation, refer to descriptions in the foregoing embodiment. Details are not described herein again.

Optionally, the first LCG may be an LCG, in all the LCGs having to-be-sent data, whose amount of to-be-sent data is greater than or equal to a first preset threshold. The first preset threshold may be specifically determined based on a system configuration.

During specific implementation, the terminal device may compare amount of to-be-sent data on each of all the LCGs having to-be-sent data with the first preset threshold, to determine whether all the LCGs having to-be-sent data include a first LCG whose amount of to-be-sent data is greater than or equal to the first preset threshold. If a quantity of first LCGs in the LCGs having to-be-sent data is less than a quantity of LCGs whose amount of to-be-sent data can be indicated by the truncated BSR, the terminal device may further select, in the manner described in the foregoing first case and based on priority of each LCG, some LCGs from all remaining LCGs having to-be-sent data, so that a total quantity of the first LCGs and the some LCGs selected from all the remaining LCGs having to-be-sent data is the quantity of LCGs whose amount of to-be-sent data can be indicated by the truncated BSR. If a quantity of first LCGs in the LCGs having to-be-sent data is equal to a quantity of LCGs whose amount of to-be-sent data can be indicated by the truncated BSR, the terminal device may use a quantity of first LCGs as the LCGs whose amount of to-be-sent data can be indicated by the truncated BSR. If a quantity of first LCGs in the LCGs having to-be-sent data is greater than a quantity of LCGs whose amount of to-be-sent data can be indicated by the truncated BSR, the terminal device may select, from multiple first LCGs based on priority of each first LCG, first LCGs whose amount of to-be-sent data can be indicated by the truncated BSR.

Optionally, the first LCG may be an LCG, in all the LCGs having to-be-sent data, that includes an LCH whose amount of to-be-sent data is greater than or equal to a second preset threshold. The second preset threshold may be specifically determined based on a system configuration.

During specific implementation, the terminal device may compare amount of to-be-sent data on an LCH having to-be-sent data in each of all the LCGs having to-be-sent data with the second preset threshold, to determine whether all the LCGs having to-be-sent data include a first LCG whose amount of to-be-sent data is greater than or equal to the first preset threshold. If a quantity of first LCGs in the LCGs having to-be-sent data is less than a quantity of LCGs whose amount of to-be-sent data can be indicated by the truncated BSR, the terminal device may further select, in the manner described in the foregoing first case and based on priority of each LCG, some LCGs from all remaining LCGs having to-be-sent data, so that a total quantity of the first LCGs and the some LCGs selected from all the remaining LCGs having to-be-sent data is the quantity of LCGs whose amount of to-be-sent data can be indicated by the truncated BSR. If a quantity of first LCGs in the LCGs having to-be-sent data is equal to a quantity of LCGs whose amount of to-be-sent data can be indicated by the truncated BSR, the terminal device may use a quantity first LCGs as the LCGs whose amount of to-be-sent data can be indicated by the truncated BSR. If a quantity of first LCGs in the LCGs having to-be-sent data is greater than a quantity of LCGs whose amount of to-be-sent data can be indicated by the truncated BSR, the terminal device may select, from multiple first LCGs based on priority of each first LCG, first LCGs whose amount of to-be-sent data can be indicated by the truncated BSR.

Optionally, the first LCG may be an LCG having to-be-sent data whose remaining delay time is less than or equal to a third preset threshold. The remaining delay budget herein may be a remaining delay budget of a service to which the to-be-sent data belongs. It should be noted that the third preset threshold may be specifically determined based on a system configuration.

During specific implementation, the terminal device may set a discard timer for each piece of data on each LCH in each LCG A maximum value of the discard timer is a delay corresponding to the LCH. When to-be-sent data is received on the LCH, the discard timer may be started for each piece of data, to determine whether to discard the to-be-sent data. Therefore, when a remaining delay budget of to-be-sent data on the LCG is a remaining delay budget of data with a minimum remaining delay budget on all LCHs having to-be-sent data in the LCG, the terminal device may determine, based on a remaining timeout time (a remaining delay budget) of a discard timer of each piece of data on each LCH in each of all the LCGs having to-be-sent data, a remaining delay budget of to-be-sent data on each of all the LCGs having to-be-sent data.

Alternatively, the terminal device may set a discard timer for each LCH in each LCG A maximum value of the discard timer is a delay corresponding to the LCH. When to-be-sent data is received on the LCH, the discard timer may be started, to determine whether to discard the to-be-sent data. Therefore, when a remaining delay budget of to-be-sent data on the LCG is a minimum value in remaining delay budgets of all LCHs having to-be-sent data in the LCG, the terminal device may determine, based on a remaining timeout time (a remaining delay budget) of a discard timer of each LCH in each of all the LCGs having to-be-sent data, a remaining delay budget of to-be-sent data on each of all the LCGs having to-be-sent data.

Alternatively, when a remaining delay budget of to-be-sent data on the LCG is a minimum value in remaining delay budgets of all LCHs having to-be-sent data in the LCG; the terminal device may set a discard timer for each LCG A maximum value of the discard timer is a delay corresponding to an LCH having a highest delay requirement in the LCG When to-be-sent data is received on any LCH in the LCG, the discard timer may be started. Therefore, in this implementation, the terminal device may determine, based on a remaining timeout time (remaining delay budget) of a discard timer of each of all the LCGs having to-be-sent data, a remaining delay budget of to-be-sent data on each of all the LCGs having to-be-sent data.

After obtaining the remaining delay budget of the to-be-sent data on each LCG, the terminal device may compare the remaining delay budget of the to-be-sent data on each LCG with the third preset threshold, to determine whether there is a first LCG in which a remaining delay budget of to-be-sent data is less than or equal to the third preset threshold. If a quantity of first LCGs in the LCGs having to-be-sent data is less than a quantity of LCGs whose amount of to-be-sent data can be indicated by the truncated BSR, the terminal device may further select, in the manner described in the foregoing first case and based on priority of each LCG, some LCGs from all remaining LCGs having to-be-sent data, so that a total quantity of the first LCGs and the some LCGs selected from all the remaining LCGs having to-be-sent data is the quantity of LCGs whose amount of to-be-sent data can be indicated by the truncated BSR. If a quantity of first LCGs in the LCGs having to-be-sent data is equal to a quantity of LCGs whose amount of to-be-sent data can be indicated by the truncated BSR, the terminal device may use a quantity of first LCGs as the LCGs whose amount of to-be-sent data can be indicated by the truncated BSR. If a quantity of first LCGs in the LCGs having to-be-sent data is greater than a quantity of LCGs whose amount of to-be-sent data can be indicated by the truncated BSR, the terminal device may select, from multiple first LCGs based on priority of each first LCG, first LCGs whose amount of to-be-sent data can be indicated by the truncated BSR.

Optionally, the first LCG may be an LCG, in all the LCGs having to-be-sent data, including new to-be-sent data. The new to-be-sent data herein is to-be-sent data newly buffered by an LCH of the terminal device after the terminal device sends a previous BSR (where the BSR may be the BSR shown in FIG. 4, may be the foregoing truncated BSR, or may be any other BSR, for example, a BSR triggered by arrival of new data).

During specific implementation, the terminal device may determine, based on to-be-sent data on an LCH having to-be-sent data in each of all the LCGs having to-be-sent data, whether all the LCGs having to-be-sent data include a first LCG having new to-be-sent data. If a quantity of first LCGs in the LCGs having to-be-sent data is less than a quantity of LCGs whose amount of to-be-sent data can be indicated by the truncated BSR, the terminal device may further select, in the manner described in the foregoing first case and based on priority of each LCG, some LCGs from all remaining LCGs having to-be-sent data, so that a total quantity of the first LCGs and the some LCGs selected from all the remaining LCGs having to-be-sent data is the quantity of LCGs whose amount of to-be-sent data can be indicated by the truncated BSR. If a quantity of first LCGs in the LCGs having to-be-sent data is equal to a quantity of LCGs whose amount of to-be-sent data can be indicated by the truncated BSR, the terminal device may use a quantity of first LCGs as the LCGs whose amount of to-be-sent data can be indicated by the truncated BSR. If a quantity of first LCGs in the LCGs having to-be-sent data is greater than a quantity of LCGs whose amount of to-be-sent data can be indicated by the truncated BSR, the terminal device may select, from multiple first LCGs based on priority of each first LCG, first LCGs whose amount of to-be-sent data can be indicated by the truncated BSR.

Optionally, the first LCG may be an LCG, in all the LCGs having to-be-sent data, that includes new to-be-sent data whose amount is greater than or equal to a fourth preset threshold. Alternatively, the first LCG may be an LCG, in all the LCGs having to-be-sent data, that includes new to-be-sent data whose ratio is greater than or equal to a fifth preset threshold. The ratio of the new to-be-sent data is a ratio of amount of the new to-be-sent data to amount of to-be-sent data on the first LCG, a ratio of amount of the new to-be-sent data to data amount obtained by subtracting the amount of the new to-be-sent data from amount of to-be-sent data on the first LCG, or the like. Implementation principles and technical effects thereof are similar to those of the foregoing manner. Details are not described herein again. The fourth preset threshold and the fifth preset threshold may be specifically determined based on a system configuration.

In a third case, a remaining delay budget of to-be-sent data on each of the part of the LCGs is less than a remaining delay budget of to-be-sent data in LCGs other than the part of the LCGs in the LCGs having to-be-sent data. For details of a remaining delay budget of to-be-sent data, refer to descriptions in the foregoing embodiments. Details are not described herein again.

During specific implementation, the terminal device may sort, based on a remaining timeout time (a remaining delay budget) of a discard timer of each of all the LCGs having to-be-sent data, all the LCGs having to-be-sent data, select, in ascending order of remaining timeout times of discard timers of all the LCGs having to-be-sent data, part of the LCGs from all the LCGs having to-be-sent data, and indicate amount of to-be-sent data on the part of the LCGs by using the truncated BSR.

In a fourth case, the part of the LCGs may be alternatively selected, based on the determined quantity of the part of the LCGs in ascending order of serial numbers of the LCGs having to-be-sent data, from all the LCGs having to-be-sent data. For descriptions of an implementation of the fourth case, refer to descriptions in the foregoing embodiment. Details are not described herein again.

As described in the foregoing embodiment, the truncated BSR is sent to the network device by the terminal device by using the MAC PDU when the idle bits in the MAC PDU is insufficient to accommodate the BSR shown in FIG. 4. Therefore, the truncated BSR is usually located at a trailer of the MAC PDU. In this scenario, after receiving the MAC PDU and decoding a MAC CE or a MAC SDU that is located before the truncated BSR in the MAC PDU, the network device may automatically determine the length of the truncated BSR based on a quantity of remaining bits in the MAC PDU. In this case, the network device may complete decoding of the truncated BSR based on the length of the truncated BSR.

Optionally, in some embodiments, the truncated BSR is not located at a trailer of the MAC PDU, in other words, there is still a MAC SDU or a MAC CE after a bit location at which the truncated BSR is located in the MAC PDU. In this scenario, the truncated BSR may be further used to indicate the length of the truncated BSR, so that the network device can complete decoding or the like of the truncated BSR based on the length of the truncated BSR, thereby ensuring efficiency of the network device in decoding the truncated BSR.

It should be noted that although in all the foregoing embodiments, the truncated BSR is described with reference to scenarios in which the idle bits in the MAC PDU is insufficient to accommodate the BSR shown in FIG. 4, a person skilled in the art may understand that the truncated BSR includes but is not limited to the foregoing application scenarios. The data transmission method provided in this embodiment of this application can be used in any scenario in which the terminal device needs to send, to the network device, indication information that is used to indicate amount of to-be-sent data on an LCG. Details are not described herein.

According to the data transmission method provided in this embodiment, when the idle bits in the MAC PDU is insufficient to accommodate the BSR that can indicate all the LCGs having to-be-sent data and amount of to-be-sent data on all the LCGs having to-be-sent data, the terminal device may generate the truncated BSR, to indicate, by using the truncated BSR, the part of the LCGs having to-be-sent data on the terminal device and the amount of the to-be-sent data on these LCGs. In this manner, when the idle bits in the MAC PDU is insufficient, the terminal device may further indicate, to the network device by using the truncated BSR, the part of the LCGs having to-be-sent data on the terminal device and the amount of the to-be-sent data on these LCGs. In this way, the network device can accurately learn of, in a timely manner, the amount of the to-be-sent data on the part of the LCGs of the terminal device, so that the network device allocates an uplink transmission resource to the terminal device more accurately and properly, thereby improving uplink transmission resource allocation efficiency.

Figure 8:
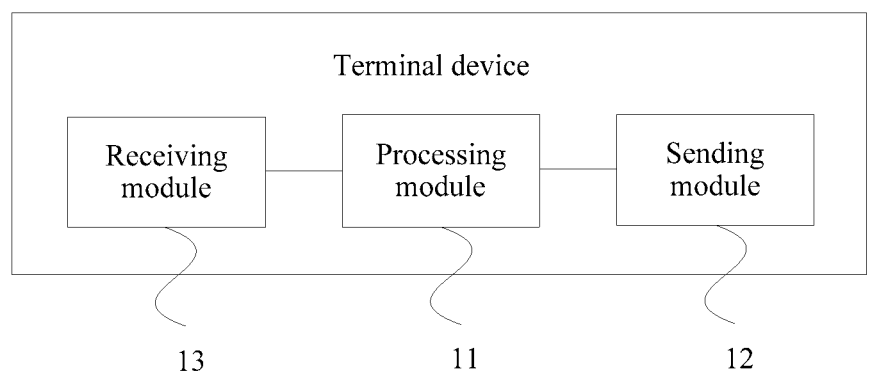
FIG. 8 is a schematic structural diagram of a terminal device according to an embodiment of this application.

FIG. 8 is a schematic structural diagram of a terminal device according to an embodiment. As shown in FIG. 8, the terminal device may include a processing module 11 and a sending module 12.

The processing module 11 is configured to generate first indication information, where the first indication information is used to indicate logical channel groups having to-be-sent data and amount of to-be-sent data on part of the logical channel groups having to-be-sent data; and the sending module 12 is configured to send the first indication information.

Optionally, when each of the logical channel groups having to-be-sent data corresponds to one priority, priority of each of the part of the logical channel groups may be higher than priorities of logical channel groups other than the part of the logical channel groups in the logical channel groups having to-be-sent data.

Optionally, when each of the logical channel groups having to-be-sent data corresponds to one priority, and the logical channel groups having to-be-sent data include at least one first logical channel group, if a quantity of the at least one first logical channel group is less than a quantity of the part of the logical channel groups, the part of the logical channel groups include the at least one first logical channel group, and priorities of logical channel groups other than the at least one first logical channel group in the part of the logical channel groups are all higher than priorities of logical channel groups other than the part of the logical channel groups in the logical channel groups having to-be-sent data. If a quantity of the at least one first logical channel group is equal to a quantity of the part of the logical channel groups, the at least one first logical channel group is used as the part of the logical channel groups. If a quantity of the at least one first logical channel group is greater than a quantity of the part of the logical channel groups, part of the at least one first logical channel group are used as the part of the logical channel groups. Priority of each first logical channel group in the part of the logical channel groups is higher than priorities of first logical channel groups other than the part of the at least one first logical channel groups in the at least one first logical channel group. For example, an air interface format corresponding to the first logical channel group may be the same as an air interface format used for sending the first indication information.

Optionally, the first indication information is further used to indicate a length of the first indication information.

Still referring to FIG. 8, in some embodiments, the terminal device may further include a receiving module 13. The receiving module 13 is configured to receive second indication information, where the second indication information is used to indicate priority corresponding to at least one logical channel group of the terminal device.

The terminal device provided in this embodiment may perform the actions of the terminal device in the method embodiment shown in FIG. 5. Implementation principles and technical effects thereof are similar. Details are not described herein again.

Figure 9:
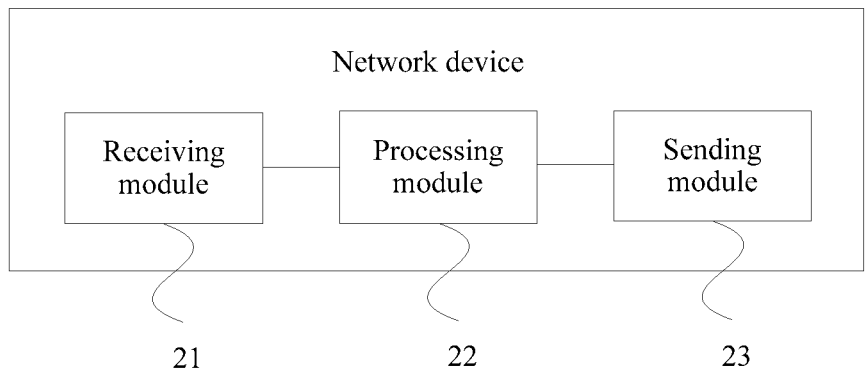
FIG. 9 is a schematic block diagram of a network device according to an embodiment of this application.

FIG. 9 is a schematic structural diagram of a network device according to an embodiment. As shown in FIG. 9, the network device may include a receiving module 21 and a processing module 22.

The receiving module 21 is configured to receive first indication information; and the processing module 22 is configured to determine, based on the first indication information, logical channel groups having to-be-sent data and amount of to-be-sent data on part of the logical channel groups having to-be-sent data.

Optionally, when each of the logical channel groups having to-be-sent data corresponds to one priority, priority of each of the part of the logical channel groups may be higher than priorities of logical channel groups other than the part of the logical channel groups in the logical channel groups having to-be-sent data.

Optionally, when each of the logical channel groups having to-be-sent data corresponds to one priority, and the logical channel groups having to-be-sent data include at least one first logical channel group, if a quantity of the at least one first logical channel group is less than a quantity of the part of the logical channel groups, the part of the logical channel groups include the at least one first logical channel group, and priorities of logical channel groups other than the at least one first logical channel group in the part of the logical channel groups are all higher than priorities of logical channel groups other than the part of the logical channel groups in the logical channel groups having to-be-sent data. If a quantity of the at least one first logical channel group is equal to a quantity of the part of the logical channel groups, the at least one first logical channel group is used as the part of the logical channel groups. If a quantity of the at least one first logical channel group is greater than a quantity of the part of the logical channel groups, part of the at least one first logical channel group are used as the part of the logical channel groups. Priority of each first logical channel group in the part of the logical channel groups is higher than priorities of first logical channel groups other than the part of the at least one first logical channel groups in the at least one first logical channel group. For example, an air interface format corresponding to the first logical channel group may be the same as an air interface format used for sending the first indication information.

Optionally, the first indication information is further used to indicate a length of the first indication information.

Still referring to FIG. 9, in some embodiments, the network device may further include a sending module 23. The sending module 23 is configured to send second indication information, where the second indication information is used to indicate priority corresponding to at least one logical channel group of the terminal device.

The network device provided in this embodiment may perform the actions of the network device in the method embodiment shown in FIG. 5. Implementation principles and technical effects thereof are similar. Details are not described herein again.

It should be noted that the sending module may be a transmitter during actual implementation, the receiving module may be a receiver during actual implementation, and the processing module may be implemented in a form of software invoked by a processing element, or may be implemented in a form of hardware. For example, the processing module may be an independently disposed processing element, or may be integrated into a chip of the foregoing device for implementation. In addition, the processing module may be stored in a memory of the foregoing device in a form of program code, and invoked by a processing element of the foregoing device to perform the foregoing functions of the processing module. All or part of these modules may be integrated, or these modules may be implemented independently. The processing element herein may be an integrated circuit and has a signal processing capability. In an implementation process, steps in the foregoing methods or the foregoing modules may be implemented by using a hardware integrated logical circuit in the processing element, or by using an instruction in a form of software.

For example, the foregoing modules may be configured as one or more integrated circuits for implementing the foregoing method, for example, one or more application-specific integrated circuits (ASIC), one or more microprocessors (DSP), or one or more field programmable gate arrays (FPGA). For another example, when one of the foregoing modules is implemented in a form of program code invoked by a processing element, the processing element may be a general-purpose processor, for example, a central processing unit (CPU) or another processor that can invoke the program code. For another example, these modules may be integrated and implemented in a form of a system-on-a-chip (SOC).

Figure 10:
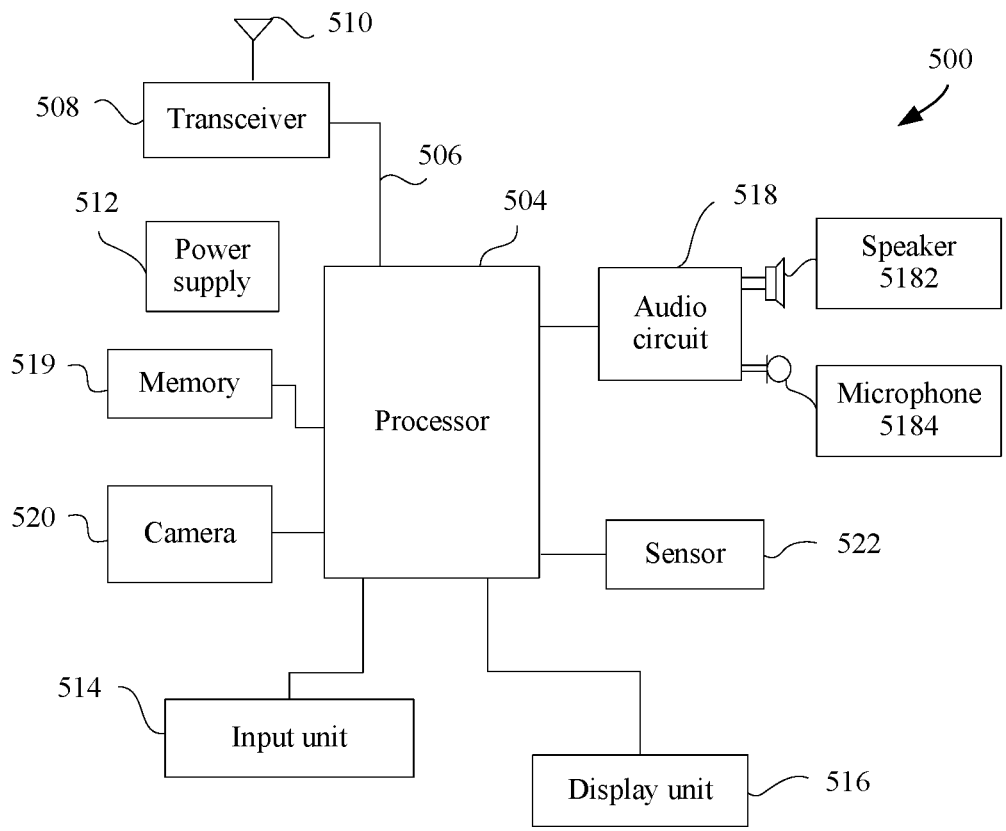
FIG. 10 is a schematic block diagram of another terminal device according to an embodiment of this application.

FIG. 10 is a schematic structural diagram of another terminal device according to an embodiment. As shown in FIG. 10, the terminal device includes at least a processor 504 and a transceiver 508. The terminal device may further include a memory 519 that stores a computer executable instruction.

The processor 504 is configured to generate first indication information, where the first indication information is used to indicate logical channel groups having to-be-sent data and amount of to-be-sent data on part of the logical channel groups having to-be-sent data; and the transceiver 508 is configured to send the first indication information generated by the processor 504.

Optionally, the transceiver 508 is further configured to receive second indication information, where the second indication information is used to indicate priority corresponding to at least one logical channel group of the terminal device.

The processor 504 may be configured to perform an action that is implemented inside the terminal device and that is described in the foregoing method embodiment, and the transceiver 508 may be configured to perform an action of receiving or sending that is performed by the terminal device from or to the network device and that is described in the foregoing method embodiment. For details, refer to the descriptions in the foregoing method embodiment. Details are not described herein again.

The processor 504 and the memory 519 may be integrated into a processing apparatus. The processor 504 is configured to execute program code stored in the memory 519, to implement the foregoing functions. During specific implementation, the memory 519 may be alternatively integrated into the processor 504.

The terminal device may further include a power supply 512, configured to supply power to various components or circuits in the terminal device. The terminal device may include an antenna 510, configured to send, by using a radio signal, uplink data or uplink control signaling that is output by the transceiver 508.

In addition, to make functions of the terminal device more complete, the terminal device may further include one or more of an input unit 514, a display unit 516, an audio circuit 518, a camera 520, a sensor 522, and the like. The audio circuit may further include a speaker 5182, a microphone 5184, and the like.

Figure 11:
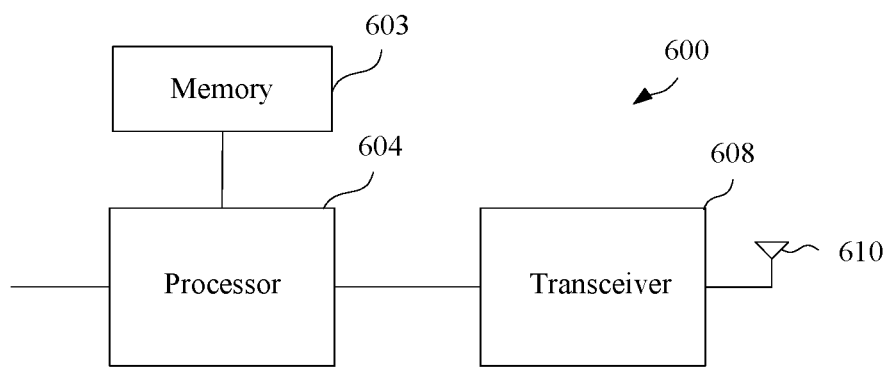
FIG. 11 is a schematic block diagram of another network device according to an embodiment of this application.

FIG. 11 is a schematic structural diagram of another network device according to an embodiment. As shown in FIG. 11, the network device 600 includes at least a processor 604 and a transceiver 608.

The transceiver 608 of the network device is configured to receive first indication information; and the processor 604 is configured to determine, based on the first indication information, logical channel groups having to-be-sent data and amount of to-be-sent data on part of the logical channel groups having to-be-sent data.

Optionally, the transceiver 608 of the network device is further configured to send second indication information, where the second indication information is used to indicate priority corresponding to at least one logical channel group of the terminal device.

The processor 604 may be configured to perform an action that is implemented inside the network device and that is described in the foregoing method embodiment, and the transceiver 608 may be configured to perform an action of receiving or sending that is performed by the network device from or to the terminal device and that is described in the foregoing method embodiment. For details, refer to the descriptions in the foregoing method embodiment. Details are not described herein again.

The processor 604 and a memory 603 may be integrated into a processing apparatus. The processor 604 is configured to execute program code stored in the memory 603, to implement the foregoing functions. During specific implementation, the memory 603 may be alternatively integrated into the processor 604.

The network device may further include an antenna 610, configured to send, by using a radio signal, downlink data or downlink control signaling that is output by the transceiver 608.

It should be noted that the processor 504 of the terminal device and the processor 604 of the network device each may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof.

The memory 519 of the terminal device and the memory 603 of the network device each may include a volatile memory, for example, a random access memory (RAM); and may further include a non-volatile memory, for example, a flash memory, a hard disk drive (HDD), or a solid-state drive (SSD). Alternatively, the memory may include a combination of the foregoing types of memories.

In the embodiments, the terminal device can wirelessly communicate with the network device. In the apparatus embodiments, the network device may correspond to the network device in the method embodiment, and the terminal device may correspond to the terminal device in the method embodiment. In addition, the foregoing and other operations and/or functions of the modules of the network device and the terminal device are separately intended to implement corresponding processes in the foregoing method embodiment. For brevity, the descriptions in the method embodiment may be applied to the apparatus embodiments. Details are not described herein again.

Figure 12:
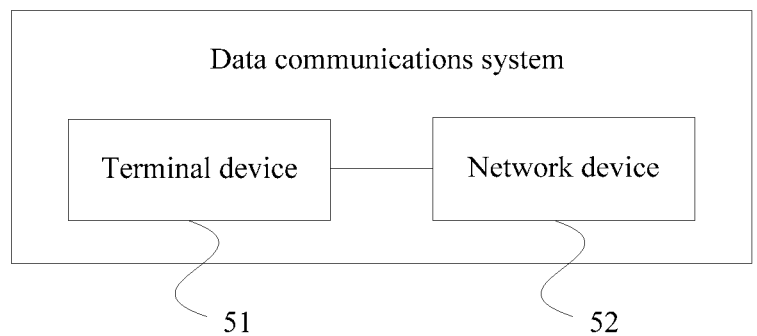
FIG. 12 is a schematic block diagram of a data communications system according to an embodiment of this application.

FIG. 12 is a schematic structural diagram of a data communications system according to an embodiment. As shown in FIG. 12, the data communications system may include a terminal device 51 and a network device 52. The terminal device 51 may be any terminal device in the foregoing embodiments, and the network device 52 may be any network device in the foregoing embodiments. Implementation principles and technical effects thereof are similar. Details are not described herein again.

According to the terminal device, the network device, and the data communications system provided in the embodiments, when idle bits in a MAC PDU is insufficient to accommodate a BSR that can indicate all the LCGs having to-be-sent data and amount of to-be-sent data on all the LCGs having to-be-sent data, the terminal device may generate the first indication information whose length is shorter than a length of the BSR, to indicate, by using the first indication information, the LCGs having to-be-sent data on the terminal device and the amount of the to-be-sent data on the part of the LCGs having to-be-sent data. In this manner, when the idle bits in the MAC PDU is insufficient, the terminal device may further indicate, to the network device by using the first indication information, remaining LCGs having to-be-sent data on the terminal device. In this way, the network device can accurately learn of, in a timely manner, the remaining LCGs having to-be-sent data on the terminal device other than the LCGs whose amount of to-be-sent data are indicated, so that the network device allocates an uplink transmission resource to the terminal device more accurately and properly, thereby improving uplink transmission resource allocation efficiency.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the illustrative embodiments.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division, and there may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, and may be located in one position, or may be distributed on a plurality of network units. Part or all of the units may be selected based on actual requirements to achieve the objectives of the solutions of the embodiments.

In addition, functional units in the embodiments may be integrated into one processing unit, or each of the units may exist alone physically, or two or more units may be integrated into one unit.

When the functions are implemented in a form of a software functional unit and sold or used as an independent product, the functions may be stored in a computer readable storage medium. Based on such an understanding, the technical solutions essentially, or the part contributing to the prior art, or part of the technical solutions may be implemented in a form of a software product. The computer software product is stored in a storage medium, and includes several instructions for instructing a computer device (which may be a personal computer, a server, a network device, or the like) to perform all or part of the steps of the methods described in the embodiments. The foregoing storage medium includes any medium that can store program code, such as a USB flash drive, a removable hard disk, a read-only memory (ROM), a random access memory (RAM), a magnetic disk, or an optical disc.

All or part of the foregoing embodiments may be implemented by using software, hardware, firmware, or any combination thereof. When software is used to implement the embodiments, all or part of the embodiments may be implemented in a form of a computer program product. The computer program product includes one or more computer instructions. When the computer program instructions are loaded and executed on a computer, all or part of the procedures or functions according to the embodiments are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a DVD), a semiconductor medium (e.g., a solid-state drive Solid State Disk (SSD)), or the like.

What is claimed is:

1. A data transmission method, comprising:
   generating a first indication information, wherein the first indication information is a buffer status report (BSR), wherein the BSR comprises:
   a first octet wherein:
   each bit of the first octet corresponds to one logical channel group (LCG) of a set of LCGs and indicates whether the corresponding LCG has to-be-sent data, and
   M bits, in the first octet, having a first value, indicate M LCGs having to-be-sent data; and
   N subsequent octets, which follow the first octet in the BSR, that indicate amount of to-be-sent data on N LCGs of the M LCGs, wherein each octet of the N subsequent octets indicates an amount of to-be-sent data on one LCG of the N LCGs, and wherein M≤8, 1≤N<M; and
   sending the first indication information.

2. The method according to claim 1, wherein each of the M LCGs having to-be-sent data comprises: one or more logic channels, and
   wherein each of the one or more logic channels corresponds to one priority.

3. The method according to claim 2, wherein priority of each LCG in the M LCGs is priority of a highest-priority logic channel in the each LCG.

4. The method according to claim 3, wherein priority of each of the N LCGs is higher than priority of a LCG other than the N LCGs in the M LCGs.

5. The method according to claim 3, wherein the M LCGs having to-be-sent data comprise L first LCGs; and
   when L is less than N, the N LCGs comprise the L first LCGs, and a priority of a LCG other than the L first LCGs in the N LCGs is higher than a priority of a LCG other than the N LCGs in the M LCGs; or
   when L is equal to N, the L first LCGs is used as the N LCGs; or
   when L is greater than N, part of the L first LCGs are used as the N LCGs, and priority of each first LCG in the N LCGs is higher than a priority of a first LCG other than the N LCGs in the L first LCGs.

6. The method according to claim 1, wherein the first indication information comprises a truncated BSR.

7. A data transmission method, comprising:
  receiving a first indication information, wherein the first indication information is a buffer status report (BSR), and wherein the BSR comprises:
    a first octet wherein:
      each bit of the first octet corresponds to one logical channel group (LCG) of a set of LCGs and indicates whether the corresponding LCG has to-be-sent data, and
      M bits, in the first octet, having a first value, indicate M LCGs having to-be-sent data; and
    N subsequent octets, which follow the first octet in the BSR, that indicate amount of to-be-sent data on N LCGs of the M LCGs, wherein each octet of the N subsequent octets indicates an amount of to-be-sent data on one LCG of the N LCGs, and wherein $M \leq 8$, $1 \leq N < M$; and
  determining, based on the first indication information, the M LCGs having to-be-sent data and amount of to-be-sent data on the N LCGs.

8. The method according to claim 7, wherein each of the M LCGs having to-be-sent data comprises: one or more logic channels, wherein each of the one or more logic channels corresponds to one priority.

9. The method according to claim 8, wherein priority of each LCG in the M LCGs is priority of a highest-priority logic channels in the each LCG.

10. The method according to claim 9, wherein priority of each of the N LCGs is higher than priority of a LCG other than the N LCGs in the M LCGs.

11. The method according to claim 7, wherein the first indication information comprises a truncated BSR.

12. A device, comprising:
  a processor and a memory storing program instructions for execution by the processor;
  wherein, by executing the program instructions, the program instructions cause the device to:
    generate a first indication information, wherein the first indication information is a buffer status report (BSR), wherein the BSR comprises:
      a first octet wherein:
        each bit of the first octet corresponds to one logical channel group (LCG) of a set of LCGs and indicates whether the corresponding LCG has to-be-sent data, and
        M bits, in the first octet, having a first value, indicate M LCGs having to-be-sent data; and
      N subsequent octets, which follow the first octet in the BSR, that indicate amount of to-be-sent data on N LCGs of the M LCGs, wherein each octet of the N subsequent octets indicates an amount of to-be-sent data on one LCG of the N LCGs, and wherein $M \leq 8$, $1 \leq N < M$; and
    send the first indication information.

13. The device according to claim 12, wherein each of the M LCGs having to-be-sent data comprises: one or more logic channels, wherein each of the one or more logic channels corresponds to one priority.

14. The method according to claim 13, priority of each LCG in the M LCGs is priority of a highest-priority logic channel in the each LCG.

15. The device according to claim 14, wherein priority of each of the N LCGs is higher than priority of a LCG other than the N LCGs in the M LCGs.

16. The device according to claim 14, wherein the M LCGs having to-be-sent data comprise L first LCGs; and
  when L is less than N, the N LCGs comprise the L first LCGs, and a priority of a LCG other than the L first LCGs in the N LCGs is higher than a priority of a LCG other than the N LCGs in the M LCGs; or
  when L is equal to N, the L first LCGs is used as the N LCGs; or
  when L is greater than N, part of the L first LCGs are used as the N LCGs, and priority of each first LCG in the N LCGs is higher than a priority of a first LCG other than the N LCGs in the L first LCGs.

17. The device according to claim 12, wherein the first indication information comprises a truncated BSR.

18. A device, comprising:
  a processor and a memory storing program instructions for execution by the processor;
  wherein, by executing the program instructions, the program instructions cause the device to:
    receive a first indication information, wherein the first indication information is a buffer status report (BSR), and wherein the BSR comprises:
      a first octet wherein:
        each bit of the first octet corresponds to one logical channel group (LCG) of a set of LCGs and indicates whether the corresponding LCG has to-be-sent data, and
        M bits, in the first octet, having a first value, indicate M LCGs having to-be-sent data; and
      N subsequent octets, which follow the first octet in the BSR, that indicate amount of to-be-sent data on N LCGs of the M LCGs, wherein each octet of the N subsequent octets indicates an amount of to-be-sent data on one LCG of the N LCGs, and wherein $M \leq 8$, $1 \leq N < M$;
    determine, based on the first indication information, the M LCGs having to-be-sent data and amount of to-be-sent data on the N LCGs.

19. The device according to claim 18, wherein each of the M LCGs having to-be-sent data comprises: one or more logic channels, wherein each of the one or more logic channels corresponds to one priority.

20. The device according to claim 19, priority of each LCG in the M LCGs is priority of highest-priority logic channels in the each LCG.

21. The device according to claim 20, wherein priority of each of the N LCGs is higher than priority of a LCG other than the N LCGs in the M LCGs.

22. The device according to claim 18, wherein the first indication information comprises a truncated BSR.

* * * * *